(12) United States Patent
Hagen et al.

(10) Patent No.: US 12,307,419 B2
(45) Date of Patent: May 20, 2025

(54) MOBILE APPARATUS WITH COMPUTER VISION ELEMENTS FOR INVENTORY CONDITION

(71) Applicant: Target Brands, Inc., Minneapolis, MN (US)

(72) Inventors: Todd A. Hagen, Minneapolis, MN (US); Donnie Tolbert, Minneapolis, MN (US); Arne Wilkin, Minneapolis, MN (US); John Ojanen, Minneapolis, MN (US); Nicholas Lojewski, Minneapolis, MN (US); Yeshwanth Gowda, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 337 days.

(21) Appl. No.: 18/080,277

(22) Filed: Dec. 13, 2022

(65) Prior Publication Data
US 2023/0230033 A1 Jul. 20, 2023

Related U.S. Application Data

(60) Provisional application No. 63/299,476, filed on Jan. 14, 2022.

(51) Int. Cl.
*G06Q 10/087* (2023.01)
*G06T 7/292* (2017.01)
*G06V 20/56* (2022.01)
(Continued)

(52) U.S. Cl.
CPC .......... *G06Q 10/087* (2013.01); *G06T 7/292* (2017.01); *G06V 20/56* (2022.01); *H04N 23/61* (2023.01);
(Continued)

(58) Field of Classification Search
CPC .............. G06Q 10/087; G06T 7/292; G06T 2207/30252; G06V 20/56; H04N 23/61;
(Continued)

(56) References Cited

U.S. PATENT DOCUMENTS

| 8,630,924 B2 | 1/2014 | Groenevelt et al. |
| 9,536,167 B2 | 1/2017 | Schwartz |

(Continued)

FOREIGN PATENT DOCUMENTS

| JP | 2015089119 A | * 5/2015 | ............ G06T 7/292 |
| WO | WO2006/040687 | 4/2006 | |

*Primary Examiner* — Russell S Glass
(74) *Attorney, Agent, or Firm* — Barnes & Thornburg LLP

(57) ABSTRACT

Described herein are systems and techniques for imaging inventory objects in an environment. A system can include a cart, a first fixed camera fixedly mounted on the cart at a first angle, a pan-tilt-zoom (PTZ) camera controllably mounted on the cart, a PTZ controller, and a cart controller. The PTZ controller can receive PTZ instructions from the cart controller and send engagement instructions to the PTZ camera. The cart controller can receive, from the first fixed camera, first image data that captures a first inventory object, determine, from the first image data, a spatial location of a first inventory object, generate PTZ instructions to cause the PTZ camera to capture the first inventory object, transmit the PTZ instructions to the PTZ controller, and receive PTZ image data that captures the first inventory object.

19 Claims, 14 Drawing Sheets

(51) Int. Cl.
*H04N 23/61* (2023.01)
*H04N 23/65* (2023.01)
*H04N 23/667* (2023.01)
*H04N 23/69* (2023.01)
*H04N 23/695* (2023.01)
*H04N 23/90* (2023.01)

(52) U.S. Cl.
CPC ......... *H04N 23/651* (2023.01); *H04N 23/667* (2023.01); *H04N 23/69* (2023.01); *H04N 23/695* (2023.01); *H04N 23/90* (2023.01); *G06T 2207/30252* (2013.01)

(58) Field of Classification Search
CPC .... H04N 23/651; H04N 23/667; H04N 23/69; H04N 23/695; H04N 23/90; H04N 23/60; H04N 23/661
USPC ........................................................ 705/28
See application file for complete search history.

(56) References Cited

U.S. PATENT DOCUMENTS

| | | | |
|---|---|---|---|
| 9,996,818 B1 | 6/2018 | Ren et al. | |
| 10,176,452 B2 | 1/2019 | Rizzolo et al. | |
| 10,289,990 B2 | 5/2019 | Rizzolo et al. | |
| 10,726,273 B2 | 7/2020 | Phan et al. | |
| 11,128,636 B1* | 9/2021 | Jorasch | G06F 3/0346 |
| 11,488,455 B1* | 11/2022 | Schoner | G07G 1/0045 |
| 2008/0077511 A1 | 3/2008 | Zimmerman | |
| 2014/0152874 A1* | 6/2014 | Clayton | G06T 7/0008 |
| | | | 382/284 |
| 2019/0034864 A1 | 1/2019 | Skaff et al. | |
| 2019/0236530 A1 | 8/2019 | Cantrell et al. | |
| 2020/0184411 A1 | 6/2020 | Shah et al. | |
| 2023/0079388 A1* | 3/2023 | Fisher | G06V 20/52 |
| | | | 382/103 |

* cited by examiner

MOBILE APPARATUS WITH COMPUTER VISION ELEMENTS FOR INVENTORY CONDITION

CROSS-REFERENCE TO RELATED APPLICATIONS

This application claims the benefit of U.S. Application Ser. No. 63/299,476, filed on Jan. 14, 2022. The disclosure of the prior application is considered part of (and is incorporated by reference in) the disclosure of this application.

TECHNICAL FIELD

This document generally relates to technology for computer vision processing for detecting inventory conditions, such as out of stock conditions for physical inventory in a retail store.

BACKGROUND

Computer vision tasks include operations for acquiring, processing, analyzing and understanding digital images, and extraction of high-dimensional data from the real world in order to produce numerical or symbolic information, e.g. in the forms of decisions. Understanding in this context includes the transformation of visual images (the input of the retina) into descriptions of the world that make sense to processes and can elicit appropriate action. This image understanding can be seen as the disentangling of symbolic information from image data using models constructed with the aid of geometry, physics, statistics, and learning theory. The image data can take many forms, such as video sequences, views from multiple cameras, multi-dimensional data from a 3D scanner, or medical scanning device.

Physical inventory or stock can include the physical goods and/or materials that a business currently has available for use, purchase, or consumption. For example, the physical inventory in a retail store can include the items that are either stocked on the store's shelves and available for customers to purchase, or that are available in the store's stock room for restocking in instances of low or out of stock conditions on the shelves. Such physical inventory for a retails store may not include inventory items that have already been purchased by customers, and in some instances, may also exclude inventory items that have been gathered by customers (e.g., placed in shopping cart) but not yet purchased. Physical inventory can vary in other contexts, though.

SUMMARY

This document generally describes technology for more accurately, efficiently, and unobtrusively determining current stock levels of physical items on shelves with computer vision. For example, determining the current stock/inventory levels for physical items has been a long-standing challenge for entities, such as retail stores. Often it has involved performing manual counts of inventory that is available on shelves, but given the labor expense associated with that technique, such counts may not be possible to be performed frequently (e.g., performed once per day). Other techniques have involved specialized shelf equipment, such as sensors and other equipment capable of electronically detecting current inventory levels on shelves. However, such specialized equipment can be expensive to implement across a larger retail store, may require significant efforts to configure and maintain, and may be prone to malfunction/breaking in the event that customers disrupt the equipment. Other techniques have relied inventory tracking server systems that correlate data from manual inventory counts, restocking events, and item sales to determine current inventory levels. However, such server systems can often fail to account for human variation injected into a retail environment, such as when customers pick up an item from its designated shelf and place it somewhere else in the store, when customers pick up an item for purchase but have not yet checked out, and inventory shortage events (e.g., theft of items).

The disclosed technology can provide for more frequent and accurate inventory condition detection, such as out of stock conditions (e.g., no inventory items available in designated shelf location for item), over manual and server-based inventory tracking, and without the added expense and complexity of shelf equipment through the use of a mobile apparatus that can optically detect and identify inventory conditions for items in an environment, such as retail store, warehouse, or other appropriate physical environment. Such a mobile apparatus can be incorporated as part of, affixed to, or otherwise mounted on movable structures/apparatus/devices that are already present and frequently used in such environments, such as shopping carts, order picking carts, restocking carts, cleaning devices (e.g., floor sweeping/cleaning machines), and/or other movable structures/apparatus/devices-permitting for unobtrusive stock condition detection as the preexisting movable structures/apparatus/devices to which the mobile apparatus is part of/affixed/attached to is moved throughout an environment (e.g., moved throughout aisles of store) during normal hours of operation (e.g., during hours while store is open). Furthermore, such a mobile apparatus can accomplish this through the use of two different computer vision systems that are used in combination to first identify instances of inventory conditions (e.g., out of stock conditions, low inventory conditions, and/or other inventory conditions) and then second to determine specific physical products that correspond to those identified inventory conditions-permitting for accurate inventory condition detection in a manner that is computationally efficient and capable of real time processing by a relatively low power edge computing device (e.g., low processor capacity and memory, such as provided by a Raspberry Pi device).

For example, the disclosed technology can include an apparatus with a camera system that provides functionality to optically analyze inventory on shelves to determine whether something on the shelves is out of stock. Such an apparatus can be configured to be mounted to or otherwise attached to a cart or other existing device or apparatus that is transported along aisles in a retail store (e.g., by a store employee). As the apparatus is moved down the aisles, the shelves can be scanned by the camera system to identify out of stock conditions. The apparatus can include, for example, a low definition fixed-perspective camera and a high resolution and/or high definition movable camera capable of moving to change its perspective, such as a pan-tilt-zoom (PTZ) camera. The low definition camera can capture low resolution images of shelves that are used by a controller that is part of the apparatus to identify whether a at least threshold area (e.g., threshold contiguous area in image) in the images resembles shelf backing. Pixel-by-pixel segmentation and classification can be used as part of this process. If the controller determines that at least a threshold area of the image is classified as shelf backing, an out of stock condition can be identified. The controller can then instruct the movable high definition camera to train on and iteratively zoom in on small increments to the x, y location identified from the low resolution images as having the out of stock condition. The high resolution camera can continue to incrementally zoom into the location until a product label is accurately captured. By bifurcating the out of stock condition detection across these two different camera systems, processing can be performed with edge computing at the controller of the apparatus, rather than at a remote server/computer system. The apparatus can also interface with a server system to report real-time stock information, such as transmitting a message identifying a product (e.g., UPC code for product) that is out of stock.

One or more embodiments described herein can include a system for imaging inventory objects in an environment, the system including a cart having hardware to allow the cart to be moved through an environment containing inventory objects, a first fixed camera being fixedly mounted on the cart at a first angle, a pan-tilt-zoom (PTZ) camera being controllably mounted on the cart, the PTZ camera being configured to capture PTZ images and to engage pan, tilt, and zoom operations in response to engagement instructions received from a PTZ controller, a PTZ controller having a processor, and a cart controller having a processor and memory. The PTZ controller can receive PTZ instructions from the cart controller and responsive to receiving the PTZ instructions, send the engagement instructions to the PTZ camera. The cart controller can receive, from the first fixed camera, first image data that captures a first inventory object, determine, from the first image data, a spatial location of a first inventory object, generate PTZ instructions that can cause the PTZ camera to capture the first inventory object, transmit the PTZ instructions to the PTZ controller, and receive PTZ image data that captures the first inventory object.

The embodiments described herein can optionally include one or more of the following features. For example, the first inventory object can be one of the group consisting of a product, a bar code, and a shelf location. The cart controller can also identify a movement speed of the cart that represents a speed at which the cart is moving through the environment and generating the PTZ instructions can include configuring the instructions to include continued movement of the PTZ camera so that the PTZ camera continues to capture the first inventory object. As another example, the cart controller can also generate, from the PTZ image data, a stock status for the first inventory object and transmit, through a network interface to a destination physically unconnected to the cart, a message indicating the stock status for the first inventory object. The cart controller can also perform the generating of the stock status and the transmitting of the message while the PTZ camera captures the first inventory object.

In some implementations, the PTZ camera can operate in multiple modes, the modes including at least i) a sleep mode and ii) a working mode. The working mode can consume more power than the sleep mode. The PTZ controller can also transition, in response to receiving the PTZ instructions, the PTZ camera from the sleep mode to the working mode and to later transition the PTZ camera from the working mode to the sleep mode after the PTZ image data is transmitted from the PTZ controller to the cart controller. Moreover, the first fixed camera can be maintained in a single working mode while the system is engaged. Moreover, the first fixed camera can record in lower resolution than the PTZ camera and the first fixed camera can consume less power than the PTZ camera in working mode.

The system can also include a second fixed camera being fixedly mounted on the cart at a second angle different than the first angle. The cart controller can also receive, from the second fixed camera, second image data that captures a second inventory object, determine, from the second image data, a second spatial location of a second inventory object, generate second PTZ instructions that can be configured to cause the PTZ camera to capture the second inventory object, transmit the second PTZ instructions to the PTZ controller, and receive second PTZ image data that captures the second inventory object. In generating PTZ instructions to cause the PTZ camera to capture the first inventory object, the cart controller can also look up, using an identifier of the first fixed camera, a first offset from a datastore of offsets indexed by identifiers of fixed cameras, the first offset defining a difference in location between the first fixed camera and the PTZ camera, determine a first view-location of the first inventory object within a viewspace of the first fixed camera, apply the first offset to the first view-location to generate a first PTZ-location of the object within a viewspace of the PTZ, and generate the PTZ instructions to instruct PTZ camera to pan, tilt, and zoom to capture the first PTZ-location. In generating second PTZ instructions to cause the PTZ camera to capture the second inventory object, the cart controller can also look up, using an identifier of the second fixed camera, a second offset from the datastore, the second offset defining a difference in location between the second fixed camera and the PTZ camera, determine a second view-location of the second inventory object within a viewspace of the second fixed camera, apply the second offset to the second view-location to generate a second PTZ-location of the object within the viewspace of the PTZ, and generate the second PTZ instructions to instruct PTZ camera to pan, tilt, and zoom to capture the second PTZ-location.

In some implementations, the cart can be a shopping cart. The cart can also be a floor sleeper. The cart may also include means for moving the cart.

One or more embodiments described herein can include a controller having one or more processors and computer memory storing instructions that, when executed by the one or more processors, cause the controller to receive, from a first fixed camera, first image data that captures a first inventory object, determine, from the first image data, a spatial location of a first inventory object, generate PTZ instructions that can cause the PTZ camera to capture the first inventory object, transmit the PTZ instructions to a PZ controller, and receive PTZ image data that captures the first inventory object.

The embodiments described herein can optionally include one or more of the following features. For example, the controller can identify a movement speed of the cart that represents a speed at which the cart is moving through the environment and generating the PTZ instructions can include configuring the instructions to include continued movement of the PTZ camera so that the PTZ camera continues to capture the first inventory object. Moreover, the controller can generate, from the PTZ image data, a stock status for the first inventory object and transmit, through a network interface to a destination physically unconnected to the cart, a message indicating the stock status for the first inventory object. In some implementations, the PTZ camera can operate in multiple modes, the modes including at least i) a sleep mode and ii) a working mode, the working mode consuming more power than the sleep mode.

The systems, devices, program products, and processes described throughout this document can, in some instances, provide one or more of the following advantages. For example, a cart that is being moved through an environment for a primary reason such as storing a shopper's items or scrubbing the floor can be extended to unobtrusively and automatically perform inventory-monitoring tasks. By including cameras and data components, these tasks may be performed without any particular input needed from the user of the cart and can instead passively collect data. This can improve the use of the cart without imposing costs of complexity or attention on the user. By pushing computations related to inventory management to the network edge in the form of a fleet of carts, an inventory system can decentralize the data processing tasks, reducing the load on key, central components. Using high resolution cameras, which can generate images requiring more computational resources to process and may consume more power, only when lower resolution cameras initially identify an item of interest can allow the system to more efficiently use computational resources and to use less battery power than other configurations which may, instead, engage high resolution cameras at all times and for all tasks. This can be particularly beneficial for devices like carts which are usually no tethered to a power source and must instead carry batteries.

In another example, the apparatus can be built on top of and integrated with existing in-store processes. Although the apparatus could be incorporated as part of an autonomous standalone robot, it is able to be incorporated into and used with existing devices in the store, such as a human-pushed cart, which can avoid introducing additional devices into stores, like a robot, that may block aisles or otherwise create obstacles for shoppers. Moreover, processing can be performed at the apparatus itself with edge computing, which can avoid clogging network bandwidth, increase efficiency, and use less RAM and processing power. The executable for image processing can also be small in size and more easily deployable at the controller of the apparatus.

DESCRIPTION OF DRAWINGS

Like reference symbols in the various drawings indicate like elements

DETAILED DESCRIPTION

As described above, this document describes technology that can identify inventory levels in storage areas like shelves or bins. Low-resolution cameras can capture low-resolution images of a shelf, and a controller can make an initial determination to identify possible areas where a background surface, instead of inventory items, is detected. The controller can instruct a high-resolution camera to capture images of the same area, and those high-resolution images can be used to analyze the area to identify the product with the detected inventory condition (e.g., out of stock level for product).

In some configurations, the cameras can be mounted on carts, pallet jacks, floor cleaners, lifts, or other items that move through inventory areas like retail stores, warehouses, or staging areas. As these items move to fulfill a primary task (carrying products, cleaning floors), the cameras and controller can operate to monitor inventory levels. This can advantageously provide for items with expanded functionality, which can expand the use of such items into inventory management where they could not previously be used for inventory management in the same way.

Figure 1:
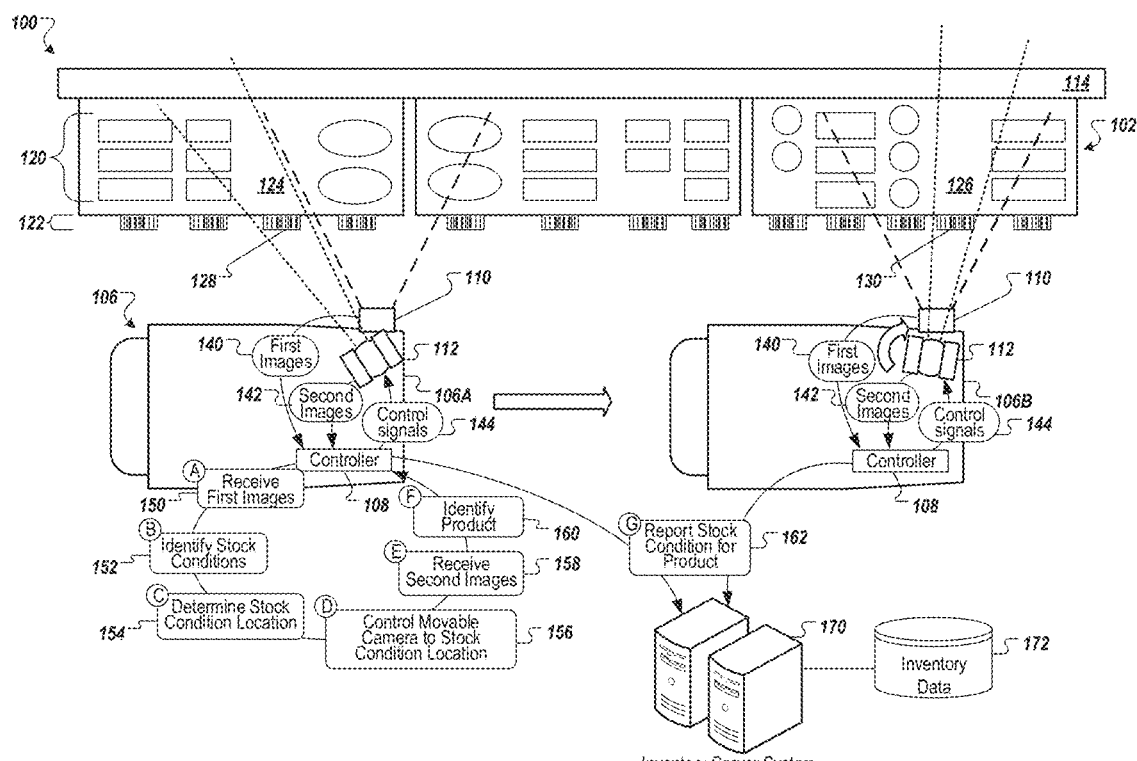
FIG. 1 shows an example system using computer vision to identify stock levels of items on shelves.

FIG. 1 shows an example system 100 using computer vision to identify stock levels of items 120 on shelves 102. In the system 100, a cart 106 (example of a movable device that apparatus can be a part of or otherwise attached to) is traveling through an aisle or other area of an environment (e.g., retail store) with shelves 102. A fixed camera 110 on the cart 106 can generate low-resolution images of the shelves 102. A movable high-resolution camera 112, such as a Pan Tilt Zoom (PTZ) camera, can also be included on the cart 106 to generate high-resolution images of specific locations on the shelves 102.

The shelves 102 can store inventory 122 for sale, storage, staging, etc. The shelves 102 can include a backer surface 114 that forms a vertical wall defining a back of each of the shelves 102. When items 120 are on the shelves 102, the items 120 can occlude view of portions of the backs 114, and when items 120 are absent from the shelves 102, such as at location 124 and location 126 on the shelves 102, more of the backs 114 can be viewed from the perspective of the cart 106. The shelves 102 can additionally include labels 122 that identify the items 120 and that are positioned adjacent to the items 120 on the shelves 102 (e.g., affixed to front surface of shelf). The labels 122 can include, for example, a product description (e.g., product name, manufacturer name, model number), a product price, and one or more unique identifiers for the product, such as a barcode or QR code that provides a UPC code for the product.

The cart 106, shown as 106A earlier and 106B later as the cart moves forward, travels past shelves 102. The cart 106 can be any sort of cart or other device that can be moved through a retail or inventory environment. Examples include, but are not limited to, shopping carts, pallet jacks, floor cleaners, lifts, autonomous inventory-moving robots, etc. In many cases, the cart 106 can include wheels, a handle or other fixture for moving the cart, and hardware (e.g., baskets, motors, scrub brushes, bags, forklift tines) for purposes other than facilitating imaging of the environment (e.g., transporting inventory, cleaning floors).

The fixed camera 110 can be non-movably affixed to the cart 106 to capture images of the environment around the cart 106. This non-movable affixing can include, for example, the camera 110 being encases in integral housings of the cart, being fastened with fasteners (e.g., screws, nuts-and-bolts). The fixed camera 110 can be mounted on the cart 106 at any of a variety of different orientations, such as angled to the side (as depicted in FIG. 1), forward, backward, and/or other orientations. For example, the camera 110 may be mounted orthogonal (e.g., at a right angle to) the direction of travel to the cart. As will be understood, other angles are possible, including angles greater than orthogonal.

The movable, high resolution camera 112 (e.g., PTZ camera) is mounted to the cart 106 in a cradle with controllable mechanisms (e.g., motors) capable panning and tilting the camera, and the movable camera 112 can further be equipped with controllable structures to optically zoom (e.g., lenses and/or mirrors). As shown, the movable camera 112 can be mounted in a position in the cart 106 such that the movable camera 112 has a point of view into the viewspace of the fixed camera 110 mounted on the cart 106. For example, the movable camera 112 can be mounted adjacent or near the fixed camera 110, such as on the same side of the cart 106 as the fixed camera 110 and within a threshold distance of the fixed camera 110 (e.g., within threshold horizontal distance, within threshold vertical distance, within overall threshold distance). In some cases, the movable camera 112 may be mounted in a common vertical plane or a common horizontal plane as the fixed camera 110.

A controller 108 can also be provided that is communicatively coupled (e.g., wired connection, wireless connection) to both the fixed camera 110 and the movable camera 112. For example, the controller 108 can receive first images 140 from the fixed camera 110 and second images 142 from the movable camera 112. The first images 140 can be low resolution images that provide a broader view of the shelf 102 and the inventory items 120, as indicated by the wider angle defined by the dashed lines emanating from the fixed camera 110. The second images 142 can be high resolution images of more specific areas of the shelf 102 (as indicated by the smaller angle defined by the dotted lines emanating from the movable camera 112) that are achieved by adjusting the movable camera 112 according to control signals 144 provided from the controller 108 to the movable camera 112. For example, the controller 108 can transmit control signals 144 that include, for example, signals to adjust pan, tilt, and zoom for the movable camera 112.

The controller 108 can identify specific items from the shelves 102 that have inventory conditions, such as being out of stock, having low inventory, having at least a threshold level of inventory, and/or other conditions. To accomplish this, the controller 108 can receive the first images 140 from the fixed camera 110, as indicated by step A (150). The controller 108 can analyze the first images 140 to identify stock conditions in the shelf 102, as indicated by step B (152). Such analysis can include, for example, identifying portions of the shelf 102 where at least a threshold area of the back 114 of the shelf 102 is identifiable in the first image from the vantage point of the fixed camera 110, which can indicate an out of stock condition. For instance, in the depicted example, the controller 108 can detect location 124 (for the cart at time 106A) and detect location 126 (for the cart at time 106B) from first images 140 including at least a threshold area depicting the back 114 of the shelf 102—indicating an out of stock condition at locations 124 and 126. Other analysis and conditions may additionally and/or alternatively be detected.

Once an out of stock condition is detected, the controller 108 can determine a physical location on the shelf 102 for the stock condition relative to the position of the cart 106 and the cameras 110/112, as indicated by step C (154). For example, the controller 108 can correlate coordinates from the first image 140 (e.g., x, y coordinates) where the stock condition is detected to a physical location relative to the position of the cart 106. Using the physical location for the stock condition, the controller 108 can generate and transmit the control signals 144 to the movable camera 112, as indicated by step D (156). The control signals 144 can be generated to move and/or otherwise adjust the movable camera 112 so that it is focused in on the area where the stock condition was detected, such as through adjusting one or more motors or other components in the movable camera 112. For example, the control signals 144 can cause the movable camera 112 to move and adjust so it is oriented on the area around the locations 124 and 126.

The controller 108 can then receive second images 142 from the movable camera 112 from the area around the target locations (e.g., locations 124 and 126), as indicated by step E (158), and analyze those second images 142 to identify a product that corresponds to the stock condition, as indicated by step F (160). Identifying the product corresponding to the stock conditions can include the controller 108 analyzing the second images 142 to detect, for example, identifying information (e.g., barcode, UPC number, product name) from product labels 122 that correspond to locations where the stock conditions are detected. For example, the controller 108 can identify the label 128 that corresponds to the location 124 and the label 130 that corresponds to the location 126, and analyze portions of the second images 142 depicting those labels 128 and 130 (e.g., image-based barcode recognition, optical character recognition, object detection techniques) to identify the corresponding product. The identifying information can include, for example, a UPC code or other unique identifier for the product.

The controller 108 can include a network interface that is capable of transmitting detected stock conditions along with product identifiers to an inventory server system 170, which can maintain a database 172 of current inventory levels, as indicated by step G (162). The inventory server system 170 be local and/or remote from the environment (e.g., retail store) where the cart 106 and the shelves 102 are located. For example, the inventory server system 170 and its inventory data 172 may be part of a broader system that is used within an individual retail store by workers to determine when to restock various items 120 on the shelves 102, and/or may be used by remote customers (e.g., mobile device user, desktop user) looking up current availability of items 120 on the shelves 102 through a mobile app or web interface. As a result, the use of the cart 106 to passively and automatically identify inventory conditions for the items 120 on the shelves 102 can provide more accurate and up-to-date inventory information for both internal users and external users. Furthermore, by adding the controller 108 and cameras 110/112 to a fleet of carts 106 and/or other movable devices/apparatus in an environment (e.g., retail store), most if not all of the environment may be traversed within a period of time (e.g., half hour, one hour, 4 hours, 8 hours) across the fleet of carts 106 and/or other devices/apparatus to provide comprehensive and updated stock condition information for the environment.

As discussed in greater detail below, the cameras 110/112 and the controller 108 may be part of the cart 106 and/or may be attachable to the cart 106. In some instances, the cameras 110/112 and the controller 108 can be contained within a common housing that can be mounted to the cart 106. Other configurations are also possible.

Figure 2:
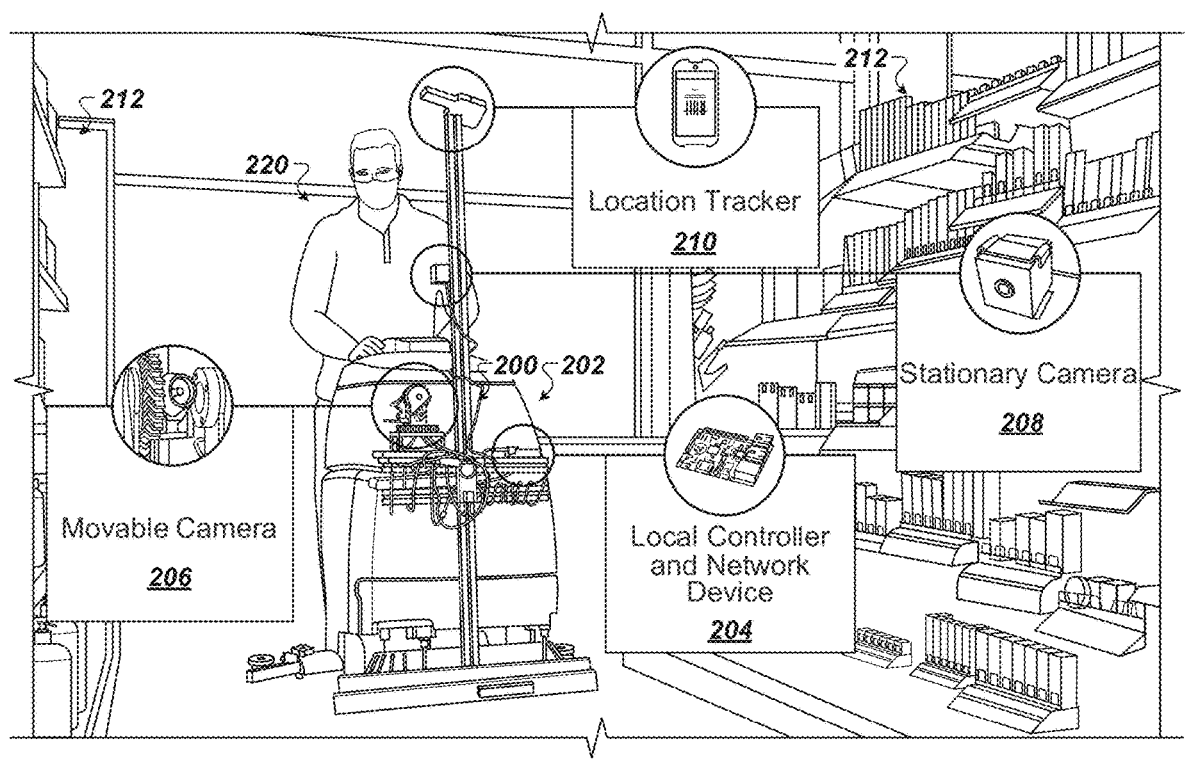
FIGS. 2 and 3 depict an example apparatus affixed to a floor sweeping machine to detect physical inventory conditions.
Figure 3:
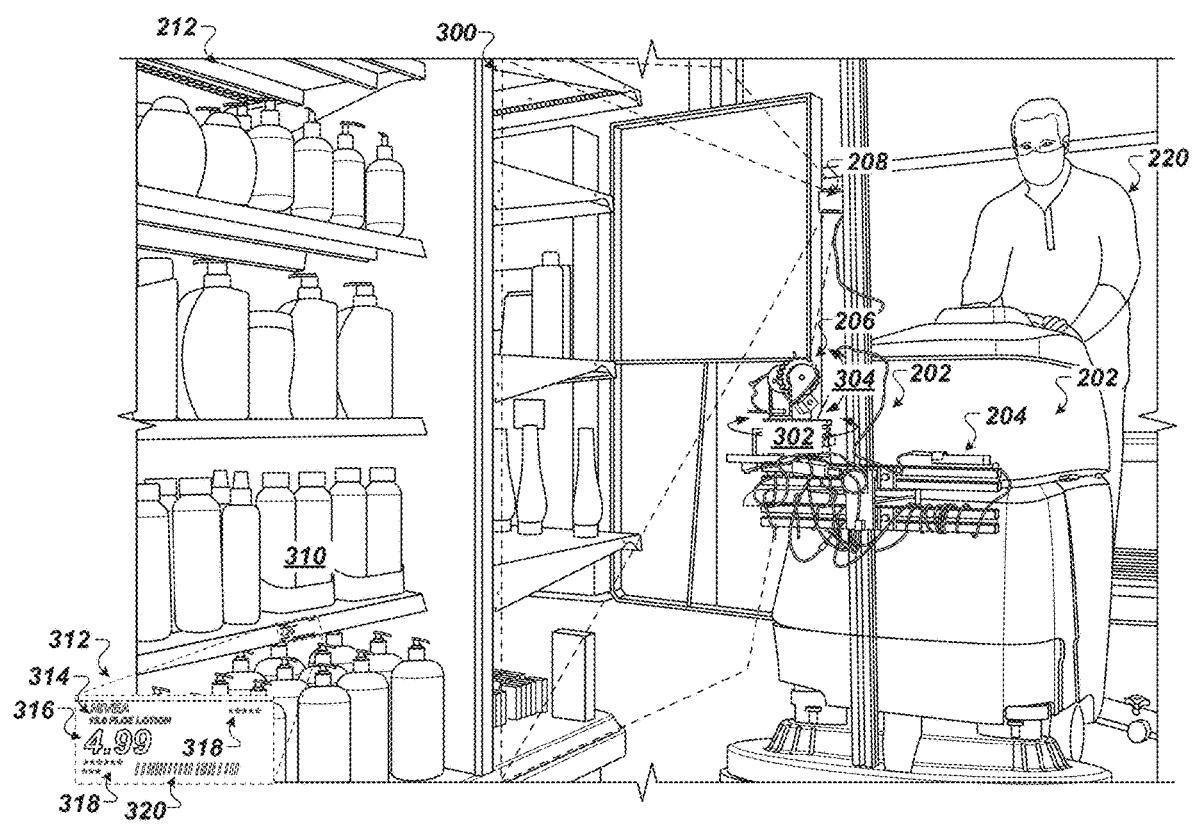

FIGS. 2 and 3 depict an example apparatus 200 affixed to a floor sweeping machine 202 to detect physical inventory conditions. The example apparatus 200 can be similar to the apparatus discussed above with regard to FIG. 1. For example, the apparatus 200 an include a local controller and network device 204 (similar to the controller 108), a movable camera 206 (similar to the movable camera 112), and a stationary camera 208 (similar to the fixed camera 110).

The apparatus 200 is also depicted as including a location tracker 210, which can be communicatively coupled (e.g. wired connection, wireless connection) to the controller 204 to provide information identifying a current location of the apparatus 200, such as the location of the apparatus 200 within an interior space, global positioning coordinates (e.g., GPS coordinates), and/or other location information. The controller 204 can be configured to use the location information for any of a variety of purposes, such as using it in combination with images from the cameras 206 and/or 208 to detect stock conditions for products on shelves 212, and/or using it to report the location where the stock conditions are detected (e.g., reporting stock condition for product with location of apparatus 200 when condition detected).

The apparatus 200 is depicted as being attached to a floor sweeping machine 202 that is manually operated by an operator 220. The apparatus 200 can automatically detect and report stock conditions in the shelves 212 without any input or direction from the operator 220. Additionally, the apparatus 200 can detect and report stock conditions in the shelves 212 passively and without altering the normal operation of the floor sweeping machine 202.

The apparatus 200 is depicted with the movable camera 206 and the stationary camera 208 being positioned along a common vertical plane, with the stationary camera 208 being positioned above the movable camera 206. Other arrangements are also possible, such as the movable camera 206 being positioned above the stationary camera 208, the movable camera 206 and the stationary camera 208 being positioned side-by-side along a common horizontal plane, and/or other configurations. The stationary camera 208 may be positioned at a height and orientation that permits for it to capture an image of the full height of the shelves 212 when the machine 202 is at one or more target distances from the shelves 212. For example, referring to FIG. 3, the stationary camera 208 can be positioned so as to have a field of view 300 that captures the full height of the shelves 212.

Still referring to FIG. 3, the movable camera 206 can have one or more axes of rotation that can provide the example ranges of motion 302 and 304. For example, the movable camera 206 can perform a pan motion 302 permitting the movable camera 206 to capture images forward or backward along the shelf 212 relative to the current location of the machine 202. The movable camera 206 can also perform a tilt motion 304 that can permit capturing images of different vertical positions of the shelf 212.

An example out of stock condition is depicted at location 310, which the controller 204 can detect using the images from the stationary camera 208. The location 310 can have a corresponding label 312 that the controller 204 can identify and analyze using images from the movable camera 206 to identify the product that is out of stock. The label can include any of a variety of information that identifies an intended product for location 310, including a product name and manufacturer 314, a product price 316, numerical product identifiers 318 (e.g., UPC code, retail store identifier, manufacturer identifier), and/or a barcode 320 that identifies the product (e.g., barcode 320 encodes numerical product identifiers in optically readable set of symbols).

Figure 4:
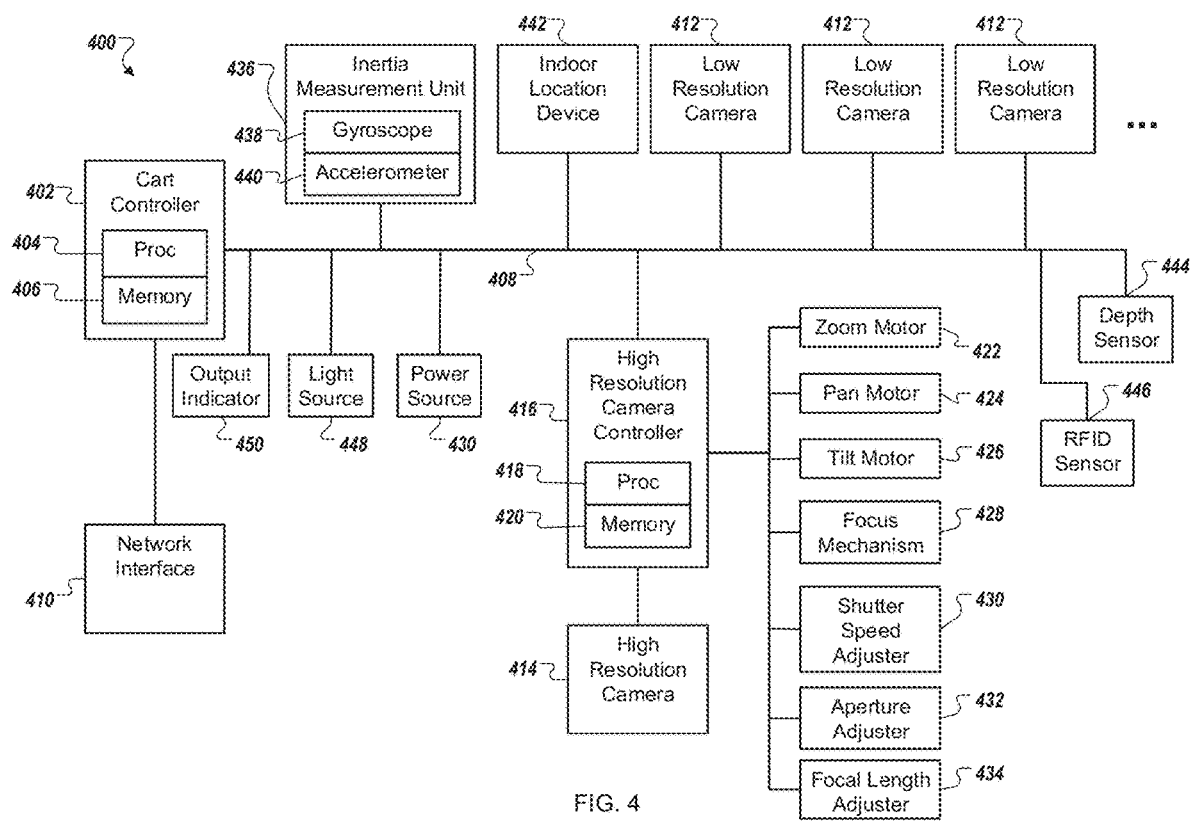
FIG. 4 shows an example of computing hardware of a cart for the collection and communication of stock levels of items on shelves.

FIG. 4 shows an example of computing hardware 400 of a cart for the collection and communication of stock levels of items on shelves. For example, the hardware 400 may be integrated into a cart 106, shopping cart 200, or floor-sweeper 300.

The system 400 can include a cart controller 402 with one or more processors 404 and memory 406. The cart controller can be integrated into the body of the cart, including by having an integrated housing made of a rigid material (e.g., plastic, metal). A data network of the cart 408 can pass through the housing, for example with wires passing through one or more ports, and/or with wireless data signals passing through the rigid material.

The data network 408 can include one or more wired and wireless data links that connect components of the system 400 to allow data communication, electrical power transmission, etc. Data network 408 can sometimes be referred to as a control area network (CAN) or a data bus. A network interface 410 can interface with one or more external data networks and allow elements of the system 400 to communicate with elements of other data processing systems including, but not limited to, remote servers, local computing devices such as smartphones, etc. The network interface can include some, all, or none of the following types of network interfaces: BLUETOOTH, WiFi, Zigbee, and Ethernet. The data network 408 can collect components including but not limited to low resolution cameras 412, a high resolution camera 414, a high resolution camera controller 416, zoom motor 422, pan motor 424, tilt motor 426, focus mechanism 428, shutter speed adjuster 430, aperture adjuster 432, focal length adjuster 434, inertia measurement unit 436, indoor location device 442, depth sensor 444. RFID sensor 446, light source 448, output indicator 450, and/or power source 452. The components 422, 424.426, 428.430, 432.434, 436.442, 444.446, 448.450, and 452 can be optional. In some implementations, fewer than all of the components 422, 424, 426, 428, 430, 432, 434, 436, 442, 444, 446, 448, 450, and 452 may be included.

Low resolution cameras 412 and a high resolution camera 414 can collect image data from the surrounding environment and transmit that image data to the controller 402. The low resolution cameras 412 can include hardware, firmware, and software capable of capturing images that produce less data (e.g., lower resolutions, at a lower framerate, and/or with fewer color) than the high resolution camera. For example, the low resolution cameras 412 may capture images every 0.5 seconds in monochrome at a resolution of 1024×600, while the high resolution camera 414 can capture images at 60 Hz in 16 bit at 3840×1600. As will be understood, the cameras 412 and/or 414 may be selectively engaged or disengaged. For example, the controller 402 may collect image data from the low resolution cameras 412 at all times, and may turn on or awaken the high resolution camera 414 only selectively. For example, the high resolution camera 414 may be engaged periodically, in response to the controller 402 identifying an item of interest in data from the low resolution cameras 412, etc. In such a way, the system 400 can gain the benefits of the use of the high resolution camera 414, without requiring he electricity to operate the high resolution camera 414 at all times.

The high resolution camera controller 416, which can include one or more processors 418 and memory 420) can control one or more operations of the high resolution camera 414. While not shown here for example, the controller 416 can receive instructions from the cart controller 402 to adjust pan, tilt, and zoom of the high resolution camera 414. In response, the controller 416 can engage one or more motors accordingly. The zoom motor 422 can engage to zoom the high resolution camera 414 in and out. The pan motor 424 can engage to pan the high resolution camera 414. The tilt motor 426 can engage to tilt the high resolution camera. As other examples, the focus mechanism 428 can be mechanical and/or digital. The focus mechanism 428 can be engaged by the controller 416 to adjust a focus of the high resolution camera 414.

The shutter speed adjuster 430 can be mechanical and/or digital. The shutter speed adjuster 430 can be engaged by the controller 416 to adjust a shutter speed of the high resolution camera 414. Similarly, the aperture adjuster 432 can be mechanical and/or digital. The aperture adjuster 432 can be engaged by the controller 416 to adjust an aperture of the high resolution camera 414. The focal length adjuster 434 can also be mechanical and/or digital. The focal length adjuster 434 can be engaged by the controller 416 to adjust a focal length of the high resolution camera 414.

The inertia measurement unit 436 can be configured to determine how much a mobile apparatus (e.g., a cart) moves throughout an environment, such as a retail environment (e.g., a store), what movements are made by the mobile apparatus, where the mobile apparatus has moved, orientation of the mobile apparatus relative to shelves and other structures or locations in the environment, and depth of field or distance between a shelf and the mobile apparatus. Accordingly, the inertia measurement unit 436 can determine orientation, speed, direction of gravity, and direction of movement relative to the direction of gravity for the mobile apparatus. The inertia measurement unit 436 can include a gyroscope 438 and an accelerometer 440 to detect movement of the mobile apparatus and make the abovementioned determinations.

The indoor location device 442 can be an upward facing camera that determines a location of the mobile apparatus in the environment based on what lights are detected in the ceiling of the environment by the indoor location device 442. For example, the indoor location device 442 can detect lights that are emitted from lightbulbs in the ceiling of the environment and can identify those lights in a lookup table that associates the lights with locations in the environment. The indoor location device 442 can then triangulate a location of the mobile apparatus based on correlating the locations for the lights that are identified via the lookup table. Sometimes, the mobile apparatus may not have the indoor location device 442 and can instead employ a different location positioning system to determine a current location of the mobile apparatus in the environment. For example, the mobile apparatus can utilize Bluetooth beacons or other global positioning devices and signals.

The depth sensor 444 can detect signals or other data that can be used by the controller 416 or the cart controller 402 to determine a depth or distance between the mobile apparatus and a particular shelf, barcode, or other region of interest (ROI) in the environment. The depth sensor 444 can, for example, be a stereoscopic camera. The depth sensor 444 can also use LiDAR and/or infrared sensors to detect depth or distance between the mobile apparatus and a particular shelf, barcode, or ROI.

The RFID sensor 446 can be used to detect and identify inventory conditions for one or more products. When locations in the retail environment are used for storing soft goods or other products that do not have definitive physical structures (e.g., clothes, towels, curtains, etc.). RFID sensor 446 readings can be used to determine whether the soft goods are out of stock. After all, image data may not be as effective in identifying out of stock conditions for products that do not have definitive physical structures that can be identified in image data. As an illustrative example, the indoor location device 442 or another indoor location system can detect current location of the mobile apparatus. When the device 442 detects that the mobile apparatus is located in a region where soft goods are typically stocked, the indoor location device 442 can send a notification to one of the controllers 402 and 416 to engage the RFID sensor 446. When the RFID sensor 446 is engaged, the RFID sensor 446 can capture RFID signal data at the mobile apparatus's current location. Such RFID signal data can be used by the cart controller 402 to determine whether there is an out of stock condition at the current location, instead of using image data captured by the high resolution camera 414.

The light source 448 can be selectively actuated and controlled by the cart controller 402. For example, the cart controller 402 can analyze one or more images captured by the low resolution cameras 412 and/or the high resolution camera 414 to determine whether the environment is too dark. If the images are dark, grainy, and/or blurry, the cart controller 402 can determine that the light source 448 should be actuated to illuminate an area that is imaged by the high resolution camera 414. The light source 448 can be an LED light. The light source 448 can also be an infrared light, a red light, or one or more other types of lights that the high resolution camera 414 is sensitive to. Actuating the light source 448 can be advantageous when the high resolution camera 414 is moving at a speed that causes the captured images to appear blurry and/or grainy.

The output indicator 450 can be configured to output can indication of whether components described herein are operating properly. The output indicator 450 can receive indications from one or more of the components described herein that indicates whether operations are being properly executed. The output indicator 450 can then output, for example, differently colored lights to demonstrate to a user of the mobile apparatus (e.g., a store employee) that the components of the mobile apparatus are functioning properly. For example, the output indicator 450 can output a green light to indicate that the components are operating correctly. The output indicator 450 can output a red light to indicate that one or more components are not working properly, thereby informing the user of the mobile apparatus that they should check the components of the mobile device to resolve the issue.

The power source 452 can be a battery (e.g., rechargeable, replaceable, removable) or other source that powers the components of the mobile apparatus. The power source 452 can be part of or integrated into the mobile apparatus. The power source 452 can also be attached to and in communication with components of the mobile apparatus described above.

Figure 5:
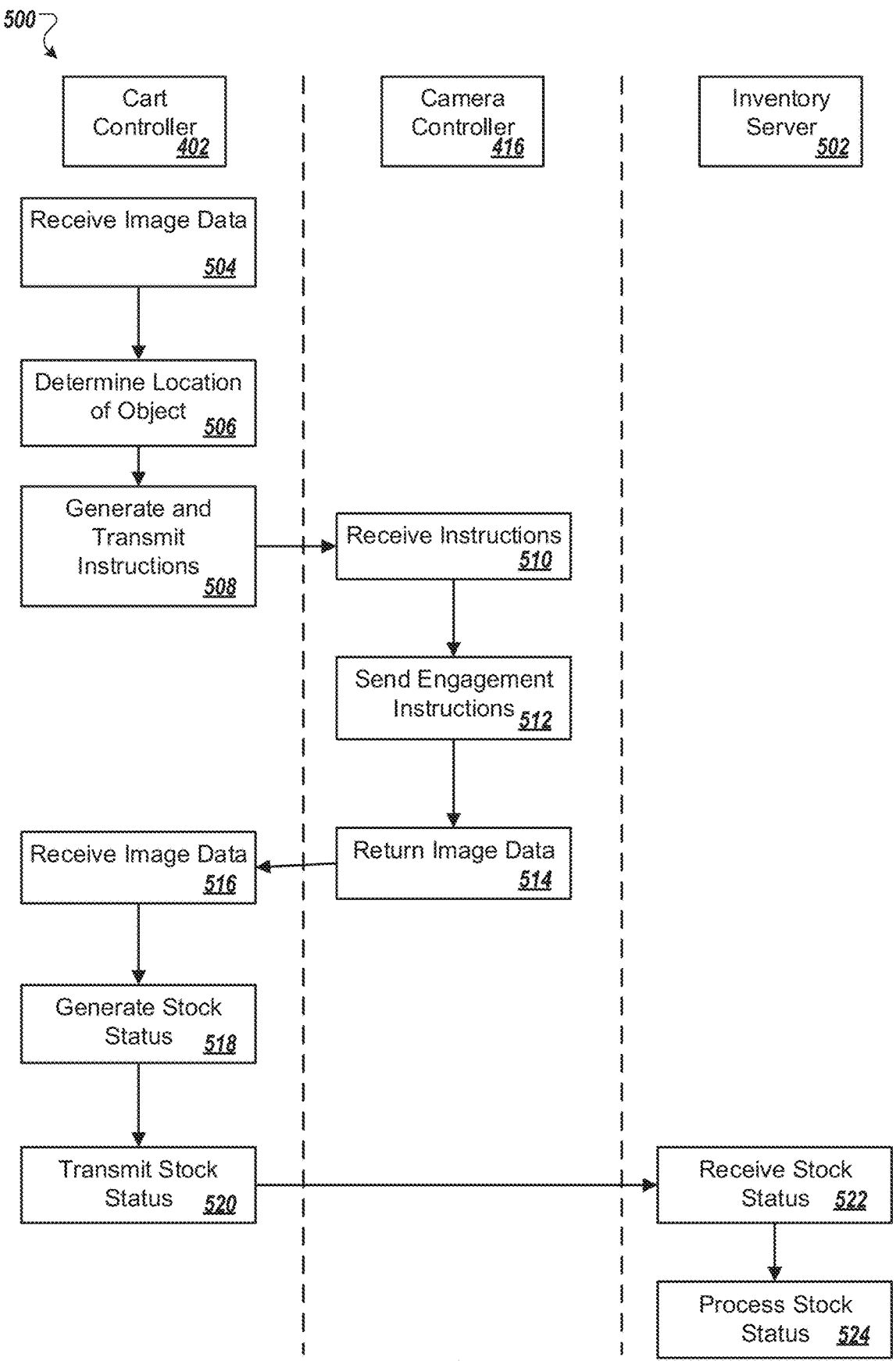
FIG. 5 shows a swimlane diagram of an example process for generating image data of inventory objects.

FIG. 5 shows a swimlane diagram of an example process 500 for generating image data of inventory objects. In the process 500, a cart such as the cart 106 can use a system 400 to collect image data of a retail environment as the cart moves through the retail environment. However, other devices and systems can be used to perform the process 500 and other processes.

The cart controller 402 is configured to receive 504, from the first fixed camera, first image data that captures a first inventory object. For example, a low resolution camera 412 can be mounted as the camera 110 on the cart 106. This camera 412 can be held at a constant angle, and connected to the cart controller 402 to send periodic, low resolution, monochrome images to the cart controller. Some of these images will, as the cart 106 passes an inventory object, capture the inventory object. The inventory object can include any sort of physical object (e.g., a box, a bag), physical space (e.g., a shelf location, an area under a hook on a pegboard), a data glyph (e.g., a bar code, a string of printed text).

The cart controller 402 is configured to determine 506, from the first image data, a spatial location of a first inventory object. For example, the cart controller 402 can apply image recognition techniques to the periodic, low resolution, monochrome images received from the camera 412. When the image recognition techniques identify an inventory object of interest, the cart controller 402 can note the spatial location relative to the camera 412 by considering the location and angle of the camera 412. For example a cart controller 402 may be tasked with monitoring for empty shelf locations. When an empty shelf location is identified, the cart controller 402 can identify a three dimensional (3D) location of the empty shelf location in the environment around the cart 106.

The cart controller 402 is configured to generate and transmit 508 instructions that are configured to cause the high resolution camera to capture the first inventory object. For example, the cart controller 402 may apply a 3D transform to the orientation of the camera 412 to adjust for the different location and orientation of the camera 414 relative to the camera 412. The cart controller 412 can use this transform to generate instructions to cause the high resolution controller 416 to pan, tilt, and/or zoom the camera 414 to capture the inventory object captured by the camera 412.

In some cases, these instructions can account for movement of the cart 106 through the environment. For example, the cart controller 402 may determine that the cart 106 is moving at a speed of 1 meter/second based on data from cameras 412, from locator beacon information, from a speedometer attached to a wheel, etc. With this speed, the cart controller 402 can include instructions to adjust the pan, tilt, and zoom over time so that the camera 414 remains trained on the inventory object while the cart moves at the 1 meter/second speed through the environment.

The high resolution controller 416 is configured to receive 510 instructions from a cart controller. For example, the cart controller 402 can send, over the network 408, the high resolution camera instructions to the high resolution controller 416.

The high resolution camera controller 416 is configured to, responsive to receiving the instructions, send 512 the engagement instructions to the high resolution camera. For example, the high resolution camera controller 416 can drive the zoom motor 422 in accordance with zoom commands receives, can drive the pan motor 424 in accordance with the pan instructions received, and can drive the tilt motor 426 in accordance with the tilt motor instructions received. One or more other instructions can be generated by the cart controller 402 in 508 and executed by the high resolution camera controller 416 in 512, including but not limited to adjusting shutter speed, focal length, lighting, focus, etc.

In some cases, the high resolution camera controller 416 can also wake the camera 414 up from an energy saving state. For example, the camera 414 can be configured to operate in a plurality of modes, the plurality of modes comprising at least i) a sleep mode and ii) a working mode, wherein the working mode consumes more power than the sleep mode. As such, the camera 414 can be kept in the sleep mode to conserve battery life of the system 400 when not needed, and only selectively awoken into the working mode when needed. In such cases, the controller 416 is configured to transition, in response to receiving the instructions, the high resolution camera from the sleep mode to the working mode and to later transition the high resolution camera from the working mode to the sleep mode after the high resolution image data is transmitted from the high resolution camera controller to the cart controller.

In comparison with the camera 414, the camera 412 can be maintained in a single working mode while the system is engaged. However, the working mode of the camera 412 may consume less power than the working mode of the camera 414. This may be due to operating at a lower resolution or due to other features consuming less power.

The high resolution camera controller 416 is configured to return 514 the high resolution camera image data and the cart controller 402 is configured to receive 516 high resolution camera image data that captures the first inventory object. For example, the high resolution camera controller 416 can send, over the network 408, images captured by the camera 414. These images may be higher resolution, use a larger color space, and/or be captured at a greater frequency than the images from the camera 412.

The cart controller 402 is configured to generate 518, from the high resolution camera image data, a stock status for the first inventory object. For example, with the higher resolution, greater color space, and/or higher frequency data from the camera 414, the cart controller 402 can apply the same or other computer vision techniques to the inventory object. This can allow for more accurate and/or more detailed information about the inventory object. For example, the cart controller 402 can differentiate between an empty shelf location and a dark object on a shelf, where such detail is not available with the data from the camera 412 alone. In another example, the data from the camera 412 may be sufficient to identify a bar code, but not sufficient to decode the barcode. In such a case, the cart controller 402 can use the data 402 to decide the bar code.

The cart controller 402 is configured to transmit 520, through a network interface to a destination physically unconnected to the cart, a message indicating the stock status for the first inventory object. For example, the cart controller 402 can generate an "out of stock" message if the inventory item is an empty shelf that should be stocked with an item, though other types of messages are possible. The cart controller 402 is configured to perform the generating of the stock status and the transmitting of the message while the high resolution camera is capturing the first inventory object. That is to say, the process 500 can be performed in 'real-time' such that messages are sent in less time than it takes the cart 106 to move away from the inventory object.

An inventory server 502 is configured to receive 522 the message. For example, an inventory server 502 may track inventory levels in a store or distribution center. When a message comes in indicating that an inventory item is not on a shelf, for example, the inventory server 502 can compare this information with internal records. If the internal records indicate that the inventory item is expected to be on the shelf, one or more corrective actions can be initiated by the server 502. For example, the inventory item can be marked as missing or as shrinkage. In some examples, a task may be generated and issued a user device requesting the user inspect the shelf to see if the item is present and misshelved, or missing. In some examples, inventory levels maintained by the inventory serve 502 may be updated to reflect the missing inventory object.

The inventory server 502 is further configured to process the stock status 524. Processing the stock status can be optionally performed in the process 500. Processing the stock status in 524 can include updating stock level information based on determinations of stock conditions that are made by the cart controller 402. Processing the stock status can also include processing one or more of the image data and verifying an out of stock condition and/or level determination that was made by the cart controller 402. Therefore, the inventory server 502 can verify out of stock determinations that are made by the cart controller 402 in order to ensure accuracy. Verifying such determinations can include receiving information from one or more other devices located throughout the environment and correlating that information.

In some implementations, the cart controller 402 can selectively transmit information or indications to the inventory server 502 in 520. For example, instead of transmitting a text file, the cart controller 402 can transmit a message indicating that there is likely an out of stock condition. With that message, the cart controller 402 can transmit one image of the likely out of stock condition and associated metadata. The inventory server 502 can then perform additional, higher level processing in 524 to verify or otherwise determine whether the out of stock determination is accurate. Selectively sending some information and data across the network in 520 can be advantageous to avoid clogging network bandwidth and to more efficiently utilize available computing resources. After all, performing out of stock determinations and validation at the inventory server 502 can utilize fewer compute resources and provide for quicker, more efficient determinations to be made in comparison to locally performing such functions at the cart controller 402.

Figure 6:
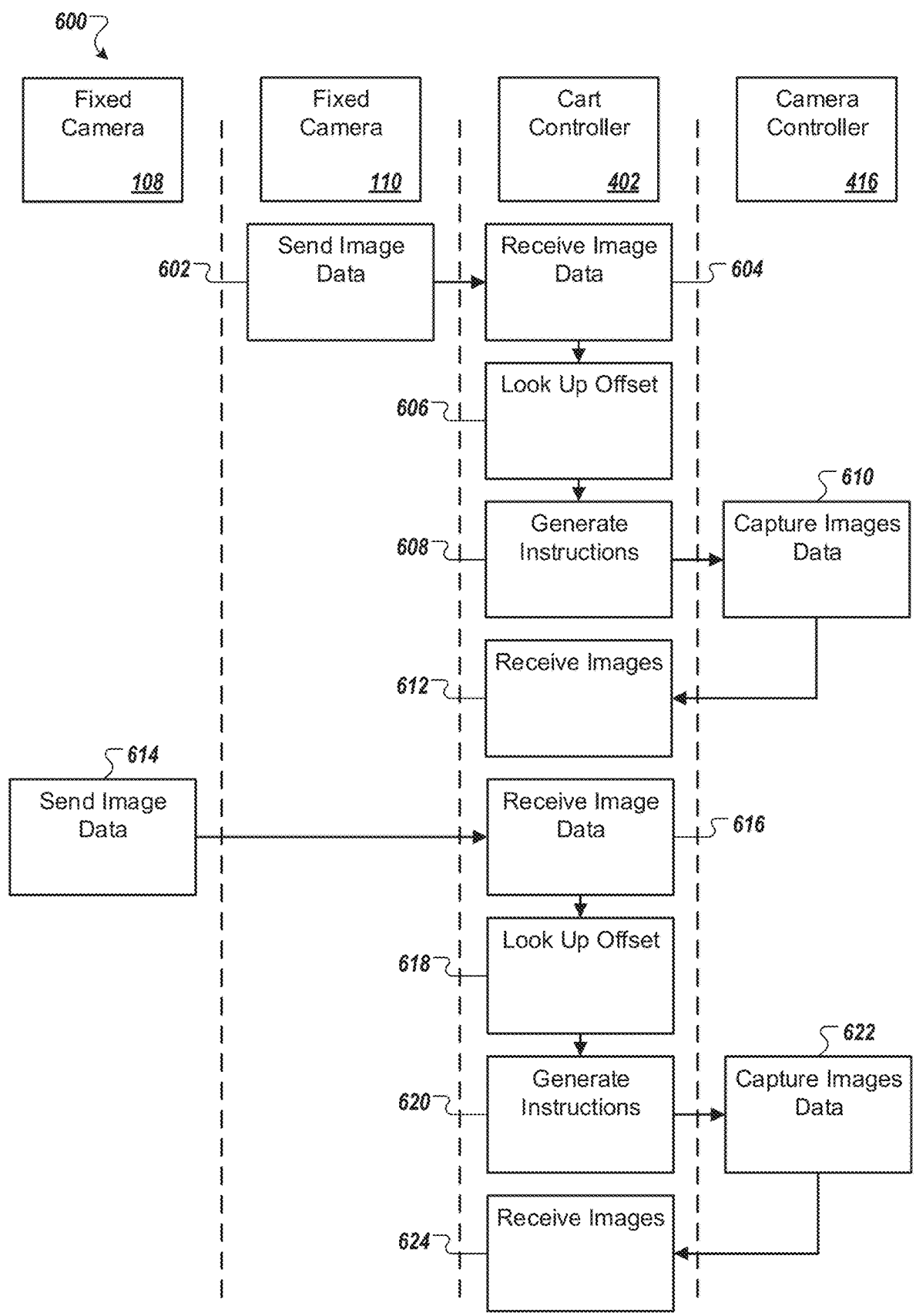
FIG. 6 shows a swimlane diagram of an example process for generating image data using a cart with multiple fixed cameras.

FIG. 6 shows a swimlane diagram of an example process 600 for generating image data using a cart with multiple fixed cameras. In the process 600, a cart such as the cart 106 can use a system 400 to collect image data from a plurality of low resolution cameras. However, other devices and systems can be used to perform the process 600 and other processes.

In the process 600, the two cameras 108 and 110 are sending 602 and 614 image data to the cart controller 402. The cart controller at 604 identifies an inventory item of interest in the data from the camera 110 and determines to collect higher-detail data with the high resolution camera. The cart controller 402 can identify a view-location in the viewspace of the camera 110, and then transform that location to a location in the viewspace of the high resolution camera.

To do so, the cart controller 402 can look up 606, using an identifier of the camera 110, a first offset that defines a difference in location between the first fixed camera and the high resolution camera. For example, the cart 402 may maintain in memory 406 a list of offsets and their associated camera identifier. The processor 402 can use this offset to modify the location in the view space of the camera 110 my, for example, multiplying the location in 3D space by a matrix that defines a translation and transformation.

The cart controller 402 can then generate instructions 608 using the modified location in order to instruct the high resolution camera to adjust (e.g., pan, tilt, and zoom) to capture the location of the object of interest. In response, the high resolution camera controller 416 can engage the motors 422-426 to capture the image data and the cart controller 402 can receive 612 the image data.

Later, the cart controller 402 can identify 416 in the received image data from the fixed camera 108 a different inventory object of interest. When this happens, the cart controller 402 will perform operations 618 and 620 to similarly generate new camera control instructions that will reorient the high resolution camera out of the view field of the fixed camera 110 and into the viewfield of the fixed camera 108. Then, the high resolution camera controller 416 can capture 622 new image data and the cart controller 402 can receive the new images 624.

Figure 7:
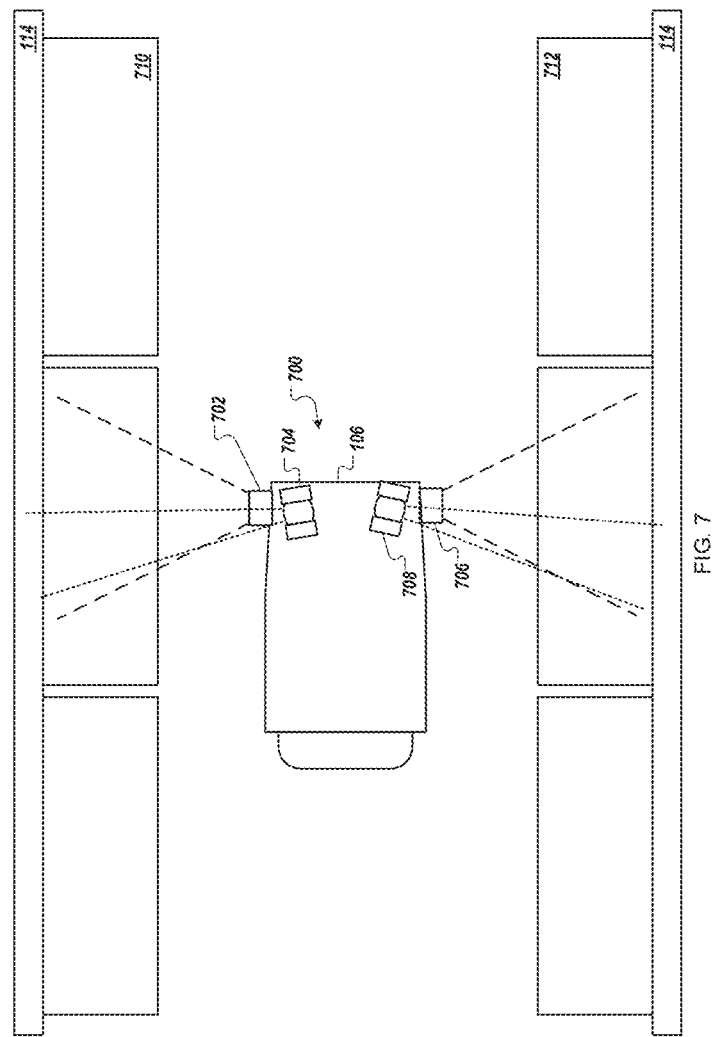
FIG. 7 shows an example apparatus for detecting inventory conditions using pairs of stationary and movable cameras on opposing sides of a cart.

FIG. 7 shows an example apparatus 700 for detecting inventory conditions using pairs of stationary and movable cameras (702-704 and 706-708) on opposing sides of a cart 106. The camera pairs 702-704 and 706-708 can each operate as described above (e.g., with regard to FIGS. 1-6) to detect inventory conditions and to identify corresponding products on their respective side of the cart 106. For example, the camera pairs 702-704 can detect inventory conditions and identify products in shelves 710 and the camera pairs 706-708 can detect inventory conditions and identify products in shelves 712. A single controller (not depicted) may be used with both camera pairs 702-704 and 706-708, and/or each camera pair may have a dedicated controller. Other configurations are also possible, such as additional camera pairs positioned on different surfaces of the cart (e.g., front of cart 106), the same surface of the cart (e.g., two camera pairs on same side), and/or other configurations.

Figure 8:
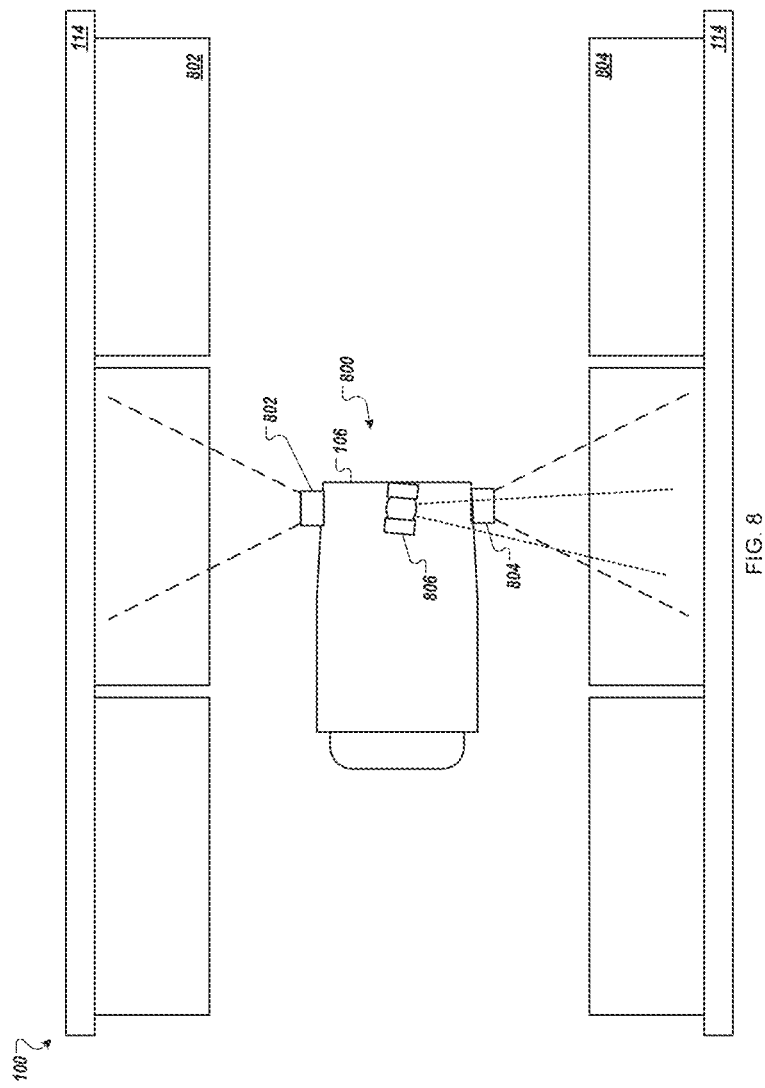
FIG. 8 shows an example apparatus for detecting inventory conditions using opposing stationary cameras, and a common movable camera on a cart.

FIG. 8 shows an example apparatus 800 for detecting inventory conditions using opposing stationary cameras 802 and 806, and a common movable camera 806 on a cart 106. In this example, the movable camera 806 can be positioned and configured to rotate so that its vantage point can capture images from either side of the cart 106, including portions of both shelves 802 and 804. The stationary cameras 802 and 806 can be used to detect inventory conditions on the shelves 802 and 804, respectively, and the movable camera 806 can then be directed to capture images of those areas to identify the product corresponding to the inventory conditions.

Figure 9A:
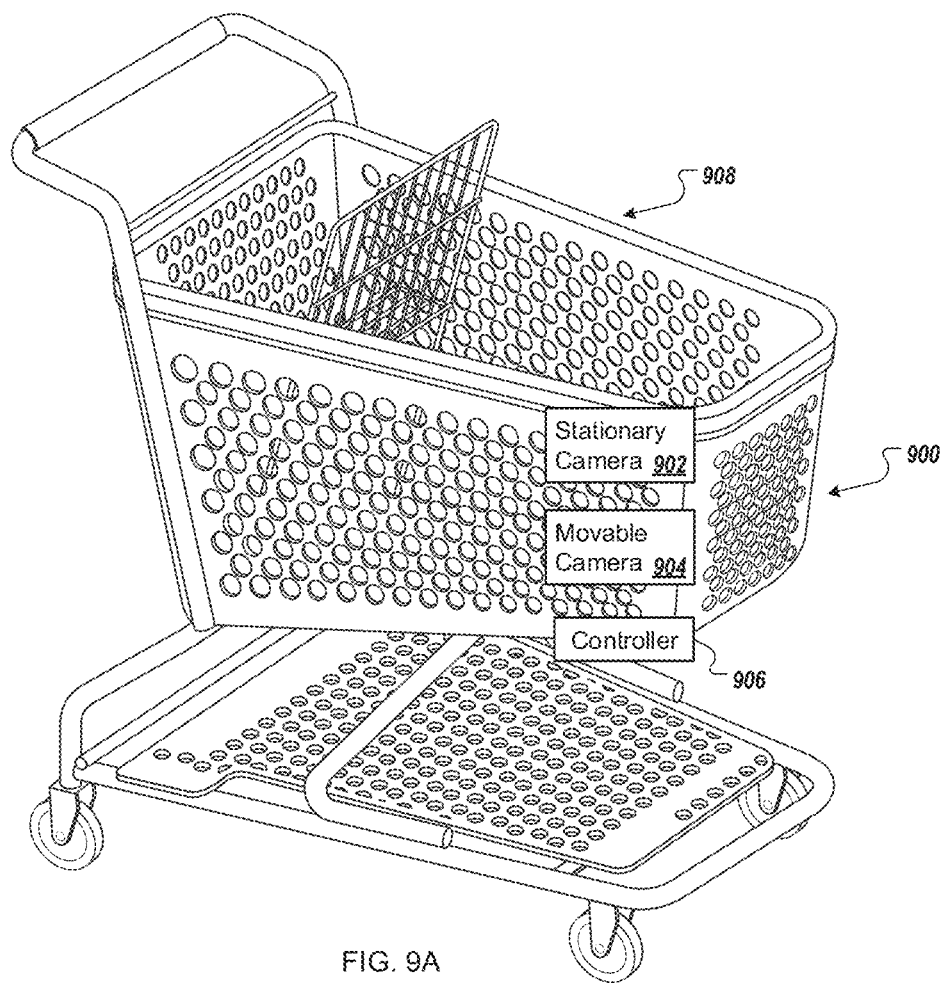
FIG. 9A shows an example configuration of an apparatus on a cart to detect inventory conditions.
Figure 9B:
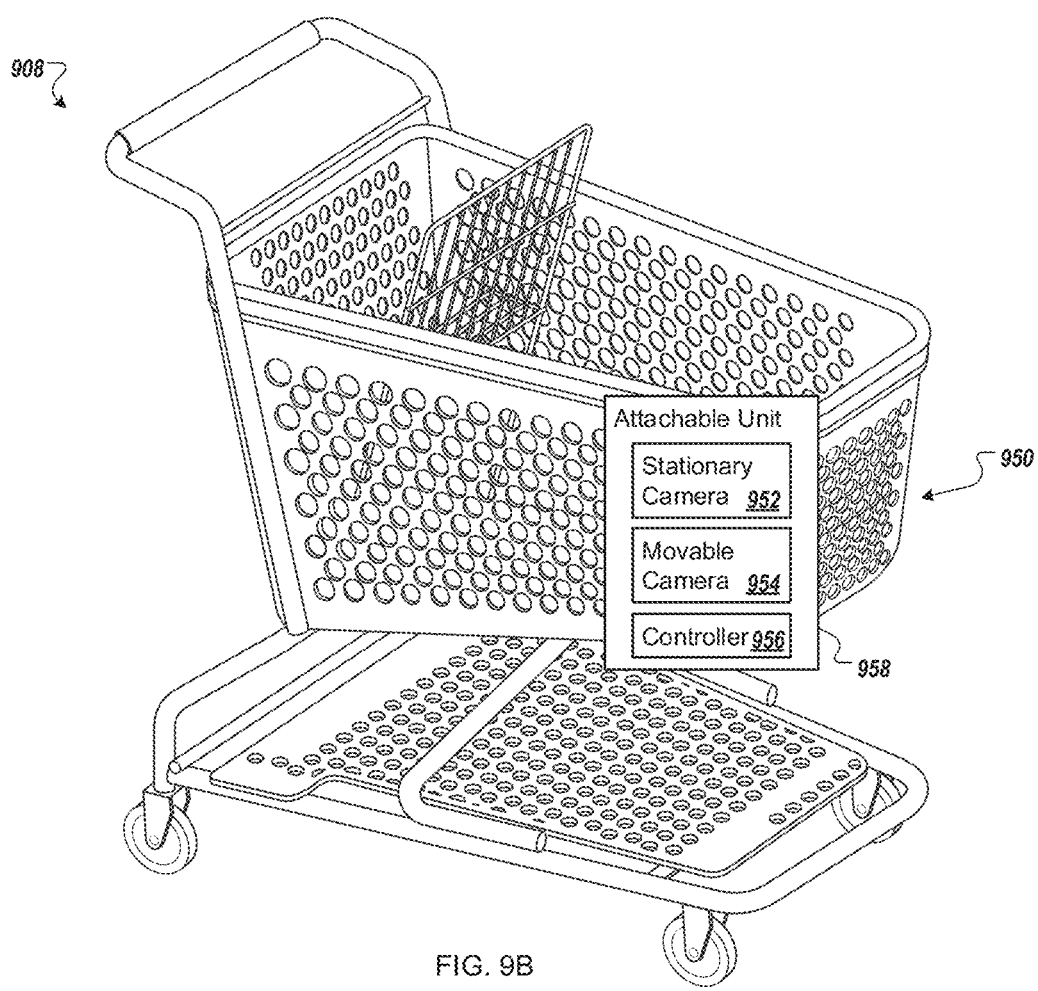
FIG. 9B shows an example configuration of an apparatus on a cart to detect inventory conditions.

FIGS. 9A-B show example configurations of an apparatus 900 and 950 on a cart 908 to detect inventory conditions. The example apparatus 900 and 950 can be similar to those described throughout this document. Referring to FIG. 9A, the apparatus 900 can include a stationary camera 902, a movable camera 904, and a controller 906 that are affixed to a side of the cart 908. In this example, the components 902-906 of the apparatus 900 can be part of the cart 908, such as being at least partially mounted and/or encased within portions of the cart 908. Referring to FIG. 9B, the apparatus 950 can be part of a separate attachable unit 958 that contains the stationary camera 952, the movable camera 954, and the controller 956, and which can be attached to the cart 908.

Figure 10A:
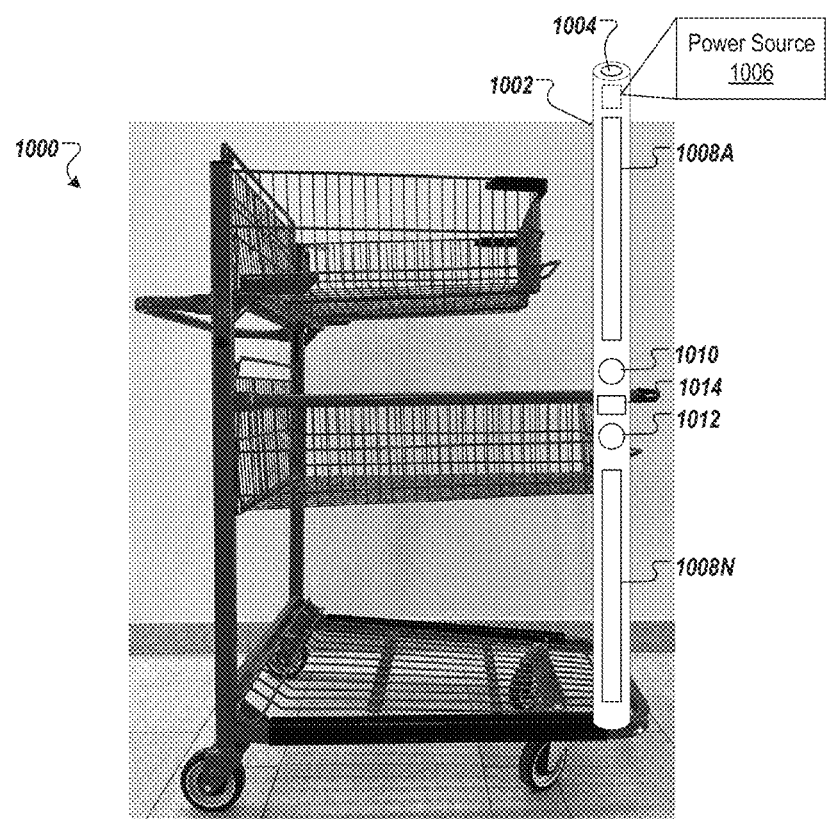
FIG. 10A shows an example configuration of an apparatus on a cart to detect inventory conditions.
Figure 10B:
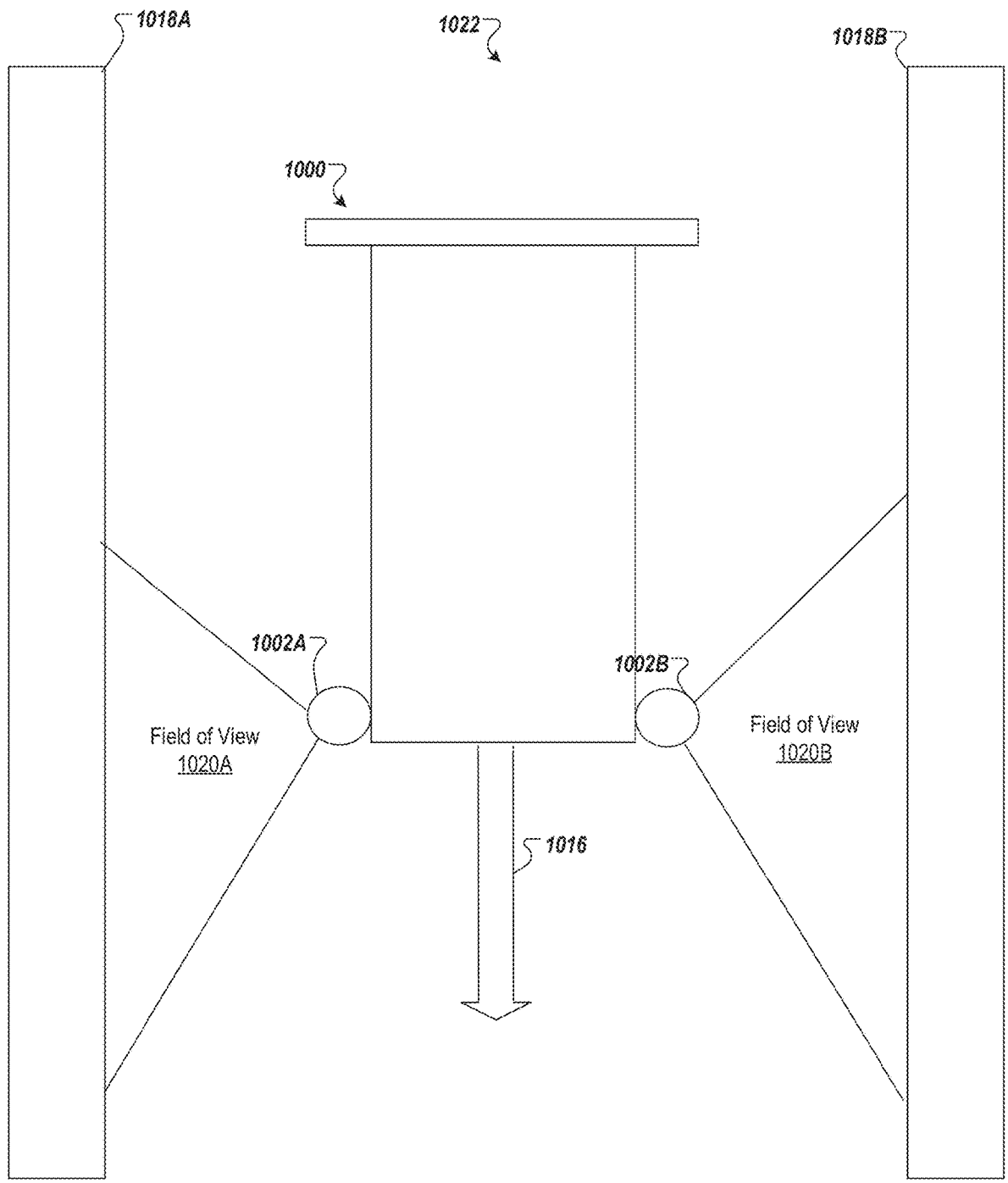
FIG. 10B shows an example configuration of an apparatus on a cart to detect inventory conditions.

FIGS. 10A-B show example configurations of an apparatus 1002 on a cart 1000 to detect inventory conditions. FIG. 10A depicts a side view of the apparatus 1002 on the cart 1000. FIG. 10B depicts a top down view of the apparatus 1002 on the cart 1000 as the cart 1000 moves through a physical environment, such as a retail store. It shall be noted that the apparatus 1002 is mobile and a user of any size and/or build can attach the apparatus 1002 to a cart, such as the cart 1000, and remove the apparatus 1002 from the cart. The apparatus 1002 can, for example, be lightweight and may include one or more clamps to attach the apparatus 1002 to a side or sides of the cart 1000. Additionally, the user can attach any quantity of the apparatus 1002 to the cart 1000. For example, an apparatus 1002 can be placed at each corner of the cart 1000. As shown in FIG. 10B, an apparatus 1002 can be placed at each front corner of the cart 1000. One or more apparatus 1002 can also be placed along sides of the cart 1000. Moreover, in some implementations, the apparatus 1002 can be clamped or otherwise mounted to one or more tiers (e.g., baskets) of the cart 1000, such as a bottom tier, a middle tier, and a top tier. As shown in FIG. 10A, for example, the apparatus 1002 can be mounted to furthest corners of the bottom tier of the cart 1000 so as to reduce any potential awkwardness for users who are using the cart 1000 (e.g., loading products into the cart 1000, removing products from the cart 1000, etc.). As another example, the apparatus 1002 can be mounted to a far right or far left side of a handle at the back of the cart 1000 to make the cart 1000 easy to operate by the users.

Referring to FIG. 10A, the apparatus 1002 can be a vertical pole that attaches to a portion of the cart 1000. For example, the apparatus 1002 can attach to one or more corners of the cart 1000, such as at a front right and/or a front left corner of the cart 1000. The apparatus 1002 can also be attached anywhere along right and/or left sides of the cart 1000 in some implementations. One or more of the components described herein in the system can be integrated into or otherwise attached to the apparatus 1002.

The apparatus 1002 may include an indoor location device 1004, one or more lights 108A-N, a high resolution camera 1010, a low resolution camera 1012, an output indicator 1014, and a power source 1006. One or more of 1004, 108A-N, 1010, 1012, 1014, and 1006 can be optional. Moreover, the components 1004, 108A-N. 1010, 1012, 1014, and 1006 can be arranged in any desired configuration.

The indoor location device 1004 can be positioned at a top of the apparatus 1002 and pointed upwards towards a ceiling of the retail environment. As described above, the indoor location device 1004 can be an upward facing camera, configured to detect a location of the cart 1000 based on identifying lights in the ceiling of the retail environment. One or more other location positioning methods can be used to determine a current location of the cart 1000 in the retail environment.

One or more of the lights 1008A-N can be configured along a length of the apparatus 1002. The lights 1008A-N can be selectively actuated (e.g., by a cart controller, not depicted in FIGS. 10A-B) to illuminate an area that is imaged by the cameras 1010 and/or 1012. In the example apparatus 1002 of FIG. 10A, there are two lights 1008A-N. The light 1008A is positioned from a top portion of the apparatus 1002 to a midpoint of the apparatus 1002. The light 1008N is positioned from slightly below the midpoint of the apparatus 1002 to a bottom portion of the apparatus 1002. As a result, the lights 1008A-N can illuminate an entire length/height of shelves or another region in the retail environment that may be imaged by the high resolution camera 1010 and/or the low resolution camera 1012. One or more other arrangements of the lights 1008A-N can be utilized. Moreover, the lights 1008A-N can include infrared lights. In some implementations, the lights 1008A-N can be white lights or other visible lights.

The high resolution camera 1010 can be a PTZ camera or other movable camera as described throughout this disclosure. The low resolution camera 1012 can be a fixed camera as described throughout this disclosure. The output indicator 1014 can output a light or other signal that can be viewed by a user of the cart 1000. The signal can indicate whether components of the apparatus 1002 are functioning properly. For example, if the high resolution camera 1010 is unable to adjust one or more movements (e.g., pan, tilt, zoom, focal length, aperture, shutter speed, etc.), then the camera 1010 can transmit a notification to the cart controller and/or the high resolution camera controller (not depicted in FIG. 10A). The controller can instruct the output indicator 1014 to output a red light, which can indicate to the user that one or more components of the apparatus 1002 are not functioning properly. The user can then service or otherwise check the components. The output indicator 1014 can output a green light whenever components described herein are functioning properly. As mentioned, one or more other indicators can be outputted to depict operational stratus of components in the apparatus 1002 and/or the cart 1000.

Finally, the power source 1006 can be integrated into the apparatus 1002. The power source 1006 can also be external to the apparatus 1002 and communicably coupled to one or more components of the apparatus 1002. The power source 1006 can be replaceable, and/or rechargeable. For example, the power source 1006 can be a rechargeable battery that can be charged and/or replaced when it is lower on power and may no longer provide enough power to one or more of the components in the apparatus 1002. In some implementations, the power source 1006 can plug into an outlet or other power source for charging purposes. When the power source 1006 is plugged in, the apparatus 1002 can be assumed to be outside of a main usage mode. The main usage mode can be when the cart 1000 is moving around an environment and images are being captured of the environment. During the main usage mode, only some image data may be transmitted to another computer system as described throughout this disclosure. For example, only image data demonstrating empty spots on shelves, price discrepancies, etc. can be transmitted to the computer system for further processing. Other image data, which can be used for training purposes or other algorithms implemented in the environment can then be transmitted to the computer system when the apparatus 1002 is not in the main usage mode. When not in the main usage mode (for example, the apparatus 1002 can be in batch mode), any and/or all data that is captured by components of the apparatus 1002 can be packaged and transmitted to the computer system described throughout this disclosure for further processing and analysis of out of stock conditions. Therefore, while the power source 1006 is charging, larger batches of data can be transmitted across networks.

Refer to FIG. 4 for further discussion about the components of the apparatus 1002.

Referring to FIG. 10B, the cart 1000 can be moving in an environment 1022. The environment 1022 can be a retail environment, such as a store, as described previously. The cart 1000 can be pushed by a user, such as a store employee. The cart 1000 can also be autonomously operated (e.g., by a robot) and can automatically move throughout the environment 1022. The cart 1000 can move in the environment 1022 and pass shelves 1018A and 1018B. The shelves 1018A and 1018B can include products, that can be in stock or out of stock, as described herein.

In the example of FIG. 10B, the cart 1000 includes two apparatuses 1002A and 1002B. Each of the apparatuses 1002A and 1002B are vertical poles that are attached to front corners of the cart 1000. The apparatuses 1002A and 1002B are described further in FIG. 10A. As the cart 1000 moves in direction 1016, cameras along each of the apparatuses 1002A and 1002B can capture image data of the respective shelves 1018A and 1018B in their respective fields of view 1020A and 1020B.

As an illustrative example, a high resolution camera on the apparatus 1002A can be configured to pan left and right (or perform other operations) to capture image data of the shelf 1018A in the camera's field of view 1020A while the cart 1000 is moving past the shelf 1018A. Similarly, a high resolution camera on the apparatus 1002B can be configured to tilt and zoom (or perform other operations) to capture image data of the shelf 1018B in the camera's field of view 1020B while the cart 1000 is moving past the shelf 1018B.

In some implementations, the cameras on the apparatuses 1002A and 1002B can be operated simultaneously by the cart controller and/or one or more high resolution camera controllers. In some implementations, only components of one of the apparatuses 1002A and 1002B may be selectively controlled and/or operated. In yet some implementations, components of the apparatus 1002A can be selectively controlled while components of the apparatus 1002B are in a sleep mode or other mode in which they are not performing operations described throughout this disclosure.

In some implementations, where the cart 1000 only has one apparatus 1002A, the cart 1000 may move down the aisle such that the camera on the apparatus 1002A captures image data of the shelf 1018A in the field of view 1020A. The cart 1000 can then be turned around and may move in a direction opposite the direction 1016 such that the camera on the apparatus 1002A can capture image data of the shelf 1018B in the field of view 1020A.

Figure 11:
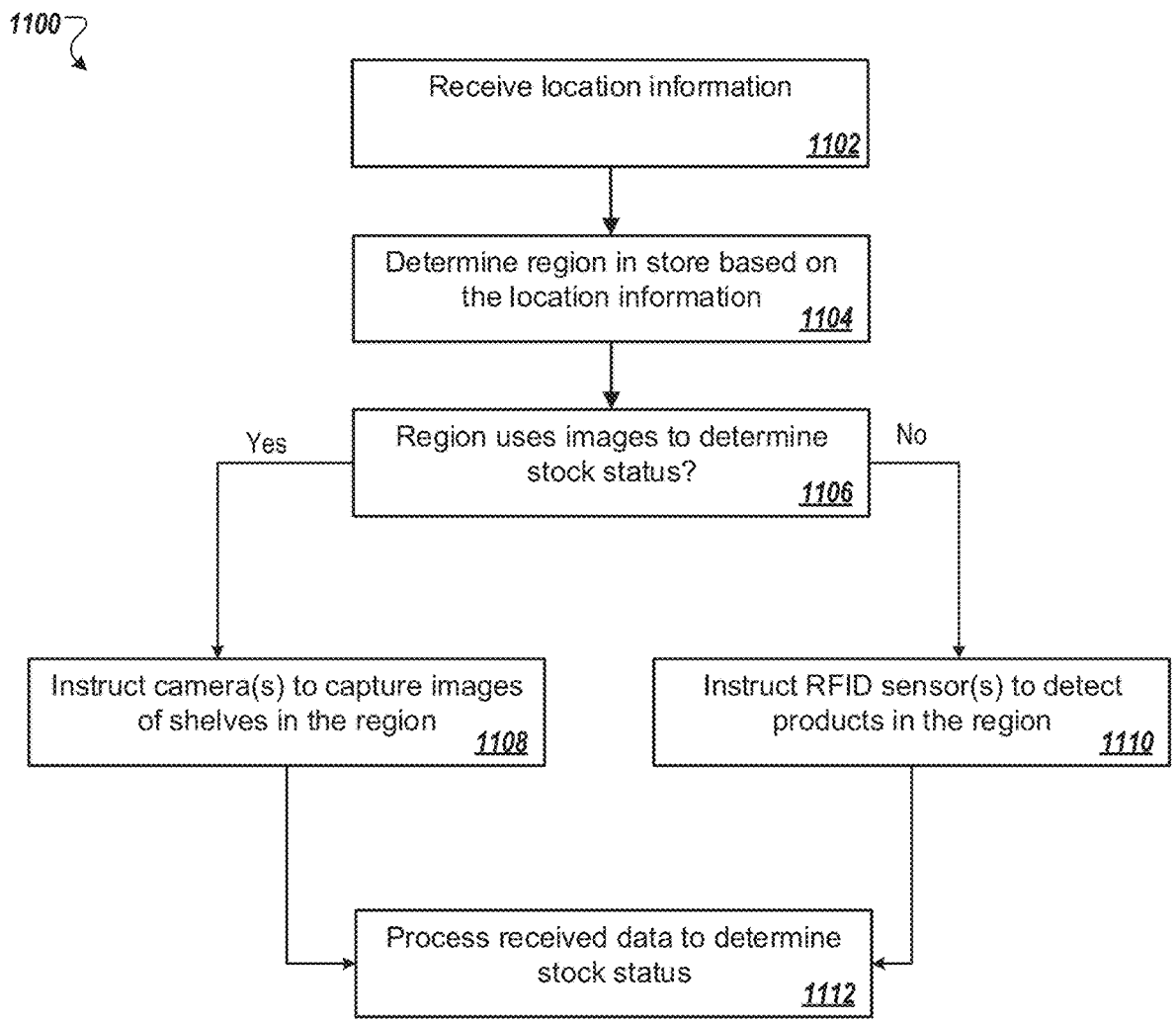
FIG. 11 is a flowchart of an example process for determining whether to use image data or RFID sensor data to detect inventory conditions.

FIG. 11 is a flowchart of an example process 1100 for determining whether to use image data or RFID sensor data to detect inventory conditions. In the process 1100, a cart such as the cart 106 or the cart 1000 can use a system 400 to collect image data and/or RFID sensor data that can be used for detecting inventory conditions. However, other devices and systems can be used to perform the process 1100 and other processes described throughout this disclosure.

Referring to the process 1100, location information is received 1102. For example, the cart controller depicted and described in reference to FIG. 4 can receive location information from one or more components, such as the indoor location device, the inertia measurement unit, one or more of the low resolution cameras, a depth sensor, and/or one or more other devices or sensors that may be positioned throughout an environment where the cart (e.g., mobile apparatus) is located. In some implementations, the cart controller can receive sensor data that can be utilized by the cart controller to determine location information (e.g., a current location) of the cart.

Next, the cart controller determines a region in the store where the cart is located based on the location information (1104). The cart controller can, for example, compare the location information to information in a lookup table. The lookup table can correlate locations (e.g., GPS coordinates, other location-based signals) to actual regions in the environment, such as departments (e.g., groceries, electronics, clothes, furniture, etc.), particular aisles, etc.

The cart controller determines whether the region uses images to determine stock status in 1106. The lookup table can also associate each region with type of products/items and preference for image data or RFID sensor data. Databases or other structured files can also contain associations between regions in the environment and type of data that can be used for determining stock status.

When the products have definite physical structures, image data can be preferred since physical shapes of the products can be more accurately extracted from the image data to determine whether a particular shelf has an out of stock condition. On the other hand, products that do not have definite physical structures may be more challenging to analyze for stock status using image data. As a result, RFID sensor data can be preferred for use in determining a stock status of those products.

As an illustrative example, boxes of cereal can be easily detected from image data for having definite, rigid structures. Those definite, rigid structures can be more easily identified and extracted from an image that contains the cereal boxes on a shelf. On the other hand, clothes can be folded and stacked on a shelf, but sometimes, the stacks of clothes may not have a uniform or definite shape or structure. Clothes can be stacked or heaped on top of each other and may form less definite shapes such as piles of fabric. As a result, identifying the clothes in image data can be more challenging. Instead, RFID sensor data can be used to determine how much of items such as clothes are located on their respective shelf and whether there is an out of stock condition.

If the region uses images for determining stock status, then the cart controller instructs one or more of the cameras to capture images of the shelves in the region (1108). In other words, the region contains products that typically have definitive physical structures. The region can be a cereal and breakfast aisle in a grocery store, by way of example.

Once the camera(s) captures images of the shelf, the camera(s) transmits the image data to the cart controller. The cart controller processes the received data as described throughout this disclosure to determine stock status (1112).

If the region uses RFID sensor data for determining stock status, then the cart controller instructs one or more RFID sensor devices to detect products in the region (1110). In other words, the region contains products that typically have non-definitive physical structures. The region can be a clothing department in a retail store, by way of example.

In some implementations, the RFID sensor devices may be continuously capturing the RFID sensor data regardless of performance of 1102-1106 described above. Therefore, in 1110, the cart controller can simply determine that the RFID sensor data should be used to determine stock status and thus request the RFID sensor data from the RFID sensor devices for use in the determination. In some implementations, the RFID sensor devices may only be turned on and instructed to capture the RFID sensor data when the cart is in a region that does not use images to determine stock status (1106).

Moreover, in some implementations, the cameras may not be continuously capturing images. Rather, the can controller can selectively turn on the cameras in 1108 when the cart controller determines that the region is one in which image data should be used for determining stock status. Only activating the cameras when they are needed for stock status determinations can save processing power and compute resources. Once the cart controller determines that the cart is located in a region of the store that does not need image data for stock status determinations, the cart controller can turn off the cameras or otherwise instruct the cameras to stop capturing images. Similarly, if the cart controller determines that the cart is standing idle (e.g., the cart has not moved for at least a predetermined period of time), the cart controller can instruct the cameras to stop capturing images to save on power consumption, processing power, and compute resources.

In some implementations, the cameras can be configured to continuously capture images as the cart moves throughout the store, however the images may not all be used for stock status determinations. The images can be continuously captured and if the cart controller determines in 1106 that the region uses images to determine stock status, then the cart controller can request the images of the region from the cameras and use just those images for this determination. Once the cart is standing idle or is plugged in and charging, as described in reference to FIGS. 10A-B, the cart controller can request, from the cameras, all of the images that were captured while the cart was moving. All of the images can then be used by the cart controller or another computer system for other processing and/or analysis of conditions in the store.

Once the RFID sensor(s) detect product data, the sensor(s) transmits the sensor data to the cart controller. The cart controller processes the received data as described throughout this disclosure to determine stock status (1112).

Figure 12:
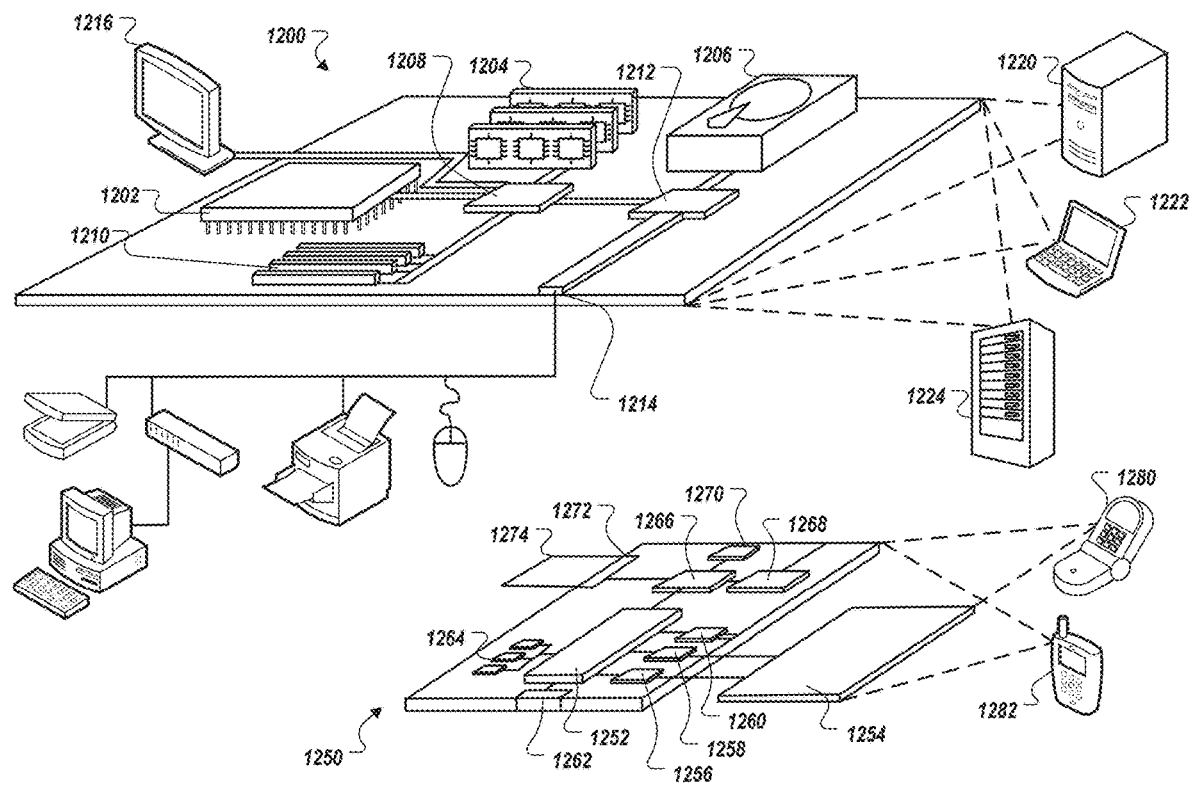
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access). PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi. or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for imaging inventory objects in a retail environment, the system comprising:
  a shopping cart;
  a fixed low resolution camera being fixedly mounted on the shopping cart at a first angle, wherein the fixed low resolution camera is maintained in a single power mode and configured to continuously capture images having a first resolution;
  a pan-tilt-zoom (PTZ) camera being controllably mounted on the shopping cart, wherein the PTZ camera is configured to capture PTZ images and to engage pan, tilt, and zoom operations in response to engagement instructions received from a PTZ controller, the PTZ camera further configured to operate in a plurality of modes, the plurality of modes comprising a sleep mode and a working mode, wherein the PTZ camera is controlled, by the PTZ controller, to switch from the sleep mode to the working mode in response to a cart controller executing processing logic to identify presence or absence of an inventory object that is detected in the images having the first resolution, wherein, in the working mode, the PTZ camera is configured to capture images having a second resolution that is higher than the first resolution;
  a cart controller comprising a processor and memory, the controller configured to:
    continuously receive, from the fixed low resolution camera, the images having the first resolution;
    identify, based on executing the processing logic, the presence of the inventory object in the images having the first resolution, wherein executing the processing logic comprises applying object detection techniques to the images having the first resolution to determine the presence or absence of the inventory object;
    determine a spatial location of the inventory object in the images having the first resolution;
    generate PTZ instructions that, when executed by the PTZ controller, are configured to cause the PTZ camera to switch from the sleep mode to the working mode and to capture the images having the second resolution;
    transmit the PTZ instructions to the PTZ controller to cause the PTZ controller to automatically execute the PTZ instructions to control the PTZ camera;
    receive, in response to the PTZ camera switching from the sleep mode to the working mode, the images having the second resolution, wherein the images having the second resolution capture the inventory object; and
    return the images having the second resolution for use in determining a stock status for the inventory object.

2. The system of claim 1, wherein the inventory object is one of the group consisting of a product, a barcode, a shelf location, and a threshold area of a shelf back.

3. The system of claim 1, wherein the cart controller is further configured to:
  identify a movement speed of the shopping cart that represents a speed at which the shopping cart is moving through the retail environment; and
  wherein generating the PTZ instructions comprises configuring the instructions to include continued movement of the PTZ camera so that the PTZ camera continues to capture the inventory object as the shopping cart moves proximate the inventory object.

4. The system of claim 1, wherein the cart controller is further configured to:
  generate, from the PTZ image data, a stock status for the inventory object; and
  transmit, through a network interface to a destination physically unconnected to the shopping cart, a message indicating the stock status for the inventory object.

5. The system of claim 4, wherein the cart controller is configured to perform the generating of the stock status and the transmitting of the message while the PTZ camera is capturing the inventory object.

6. The system of claim 1, wherein the fixed low resolution camera consumes less power than the PTZ camera while the PTZ camera is operating in the working mode.

7. The system of claim 1, wherein the system further comprises a second fixed low resolution camera being fixedly mounted on the shopping cart at a second angle different than the first angle.

8. The system of claim 7, wherein the cart controller is further configured to:
  receive, from the second fixed low resolution camera, second image data that captures a second inventory object;
  determine, from the second image data, a second spatial location of a second inventory object;
  generate second PTZ instructions that are configured to cause the PTZ camera to capture the second inventory object;
  transmit the second PTZ instructions to the PTZ controller; and
  receive second PTZ image data that captures the second inventory object.

9. The system of claim 7, wherein to generate PTZ instructions that are configured to cause the PTZ camera to capture the inventory object, the cart controller is further configured to:
  look up, using an identifier of the fixed low resolution camera, an offset from a datastore of offsets indexed by identifiers of fixed cameras, the offset defining a difference in location between the fixed low resolution camera and the PTZ camera;

determine a view-location of the inventory object within a view space of the fixed low resolution camera;

apply the offset to the view-location to generate a PTZ-location of the inventory object within a view space of the PTZ; and generate the PTZ instructions to instruct PTZ camera to pan, tilt, and zoom to capture the PTZ-location.

10. The system of claim 9, wherein to generate second PTZ instructions that are configured to cause the PTZ camera to capture the second inventory object, the cart controller is further configured to:

look up, using an identifier of the second fixed low resolution camera, a second offset from the datastore, the second offset defining a difference in location between the second fixed low resolution camera and the PTZ camera;

determine a second view-location of the second inventory object within a view space of the second fixed camera;

apply the second offset to the second view-location to generate a second PTZ-location of the inventory object within the view space of the PTZ; and generate the second PTZ instructions to instruct the PTZ camera to pan, tilt, and zoom to capture the second PTZ-location.

11. A cart controller comprising:

one or more processors; and computer memory storing instructions that, when executed by the processors, cause the cart controller to:

continuously receive, from a fixed low resolution camera, images having a first resolution;

identify, based on executing processing logic, presence of an inventory object in a retail environment in the images having the first resolution, wherein executing the processing logic comprises applying object detection techniques to the images having the first resolution to determine the presence or absence of the inventory object;

determine a spatial location of the inventory object in the images having the first resolution;

generate PTZ instructions that, when executed by a PTZ controller, are configured to cause a PTZ camera to switch from a sleep mode to a working mode, wherein, in the working mode, the PTZ camera is configured to capture images having a second resolution that is higher than the first resolution;

transmit the PTZ instructions to the PTZ controller to cause the PTZ controller to automatically execute the PTZ instructions to control the PTZ camera;

receive, in response to the PTZ camera switching from the sleep mode to the working mode, the images having the second resolution, wherein the images having the second resolution capture the inventory object; and, return the images having the second resolution for use in determining a stock status for the inventory object in the retail environment.

12. The cart controller of claim 11, wherein the cart controller is further configured to:

identify a movement speed of the PTZ camera that represents a speed at which the PTZ camera is moving through the retail environment; and wherein generating the PTZ instructions comprises configuring the instructions to include continued movement of the PTZ camera so that the PTZ camera continues to capture the inventory object as the PTZ camera moves proximate the inventory object.

13. The controller of claim 11, wherein the controller is further configured to:

generate, from the PTZ image data, a stock status for the inventory object; and transmit, through a network interface to a destination physically unconnected to a shopping cart, a message indicating the stock status for the inventory object.

14. The cart controller of claim 11, wherein executing the processing logic comprises applying the object detection techniques to the images having the first resolution to determine presence or absence of a barcode in an area that is captured in the images having the first resolution.

15. The cart controller of claim 11, wherein executing the processing logic comprises applying the object detection techniques to the images having the first resolution to determine presence or absence of a threshold area of a shelf back in an area that is captured in the images having the first resolution.

16. A method for imaging inventory objects in a retail environment comprising:

continuously receiving, from a fixed low resolution camera, images having a first resolution;

identifying based on executing processing logic, the presence of the inventory object in the images having the first resolution, wherein executing the processing logic comprises applying object detection techniques to the images having the first resolution to determine the presence or absence of the inventory object;

determining a spatial location of the inventory object in the images having the first resolution;

generating PTZ instructions that, when executed by a PTZ controller, are configured to cause a PTZ camera to switch from a sleep mode to a working mode, wherein, in the working mode, the PTZ camera is configured to capture images having a second resolution that is higher than the first resolution;

transmitting the PTZ instructions to the PTZ controller to cause the PTZ controller to automatically execute the PTZ instructions to control the PTZ camera;

receiving, in response to the PTZ camera switching from the sleep mode to the working mode, the images having the second resolution, wherein the images having the second resolution capture the inventory object;

generating, from the PTZ image data, a stock status for the inventory object; and transmitting, through a network interface, a message to a user indicating the stock status for the inventory object.

17. The method of claim 16 further comprising:

identifying a movement speed of the PTZ camera that represents a speed at which the PTZ camera is moving through the retail environment; and configuring the PTZ instructions to include continued movement of the PTZ camera so that the PTZ camera continues to capture the inventory object as the PTZ camera moves proximate the inventory object.

18. The system of claim 1, wherein executing the processing logic comprises applying the object detection techniques to the images having the first resolution to determine presence or absence of a barcode in an area that is captured in the images having the first resolution.

19. The system of claim 1, wherein executing the processing logic comprises applying the object detection techniques to the images having the first resolution to determine presence or absence of a threshold area of a shelf back in an area that is captured in the images having the first resolution.

* * * * *